(12) United States Patent
Matsunaga et al.

(10) Patent No.: US 10,192,118 B2
(45) Date of Patent: Jan. 29, 2019

(54) ANALYSIS DEVICE, RECORDING MEDIUM, AND ANALYSIS METHOD

(71) Applicant: SONY CORPORATION, Minato-Ku (JP)

(72) Inventors: Hideyuki Matsunaga, Tokyo (JP); Yusuke Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 206 days.

(21) Appl. No.: 15/105,383

(22) PCT Filed: Oct. 22, 2014

(86) PCT No.: PCT/JP2014/078116
§ 371 (c)(1),
(2) Date: Jun. 16, 2016

(87) PCT Pub. No.: WO2015/098260
PCT Pub. Date: Jul. 2, 2015

(65) Prior Publication Data
US 2016/0314352 A1    Oct. 27, 2016

(30) Foreign Application Priority Data

Dec. 27, 2013  (JP) ................. 2013-273518

(51) Int. Cl.
*G06K 9/00*     (2006.01)
*H04M 1/725*    (2006.01)
*G09B 19/00*    (2006.01)

(52) U.S. Cl.
CPC ...... *G06K 9/00724* (2013.01); *G06K 9/00342* (2013.01); *G09B 19/0038* (2013.01); *H04M 1/7253* (2013.01)

(58) Field of Classification Search
CPC .......... G06K 9/00724; G06K 9/00342; G16H 20/30; G16H 20/40; G16H 20/70; G16H 20/90; G06F 19/3481; H04M 1/7253; G09B 19/0038
See application file for complete search history.

(56) References Cited

U.S. PATENT DOCUMENTS

2009/0075738 A1*  3/2009  Pearce ................. G07F 17/32
                                                       463/42
2012/0212505 A1*  8/2012  Burroughs .......... G06F 19/3481
                                                       345/629

FOREIGN PATENT DOCUMENTS

EP    2731090 A       5/2014
JP    2012-139493 A   7/2012
JP    2012-254205 A   12/2012

* cited by examiner

*Primary Examiner* — Jasson Yoo
(74) *Attorney, Agent, or Firm* — Chip Law Group

(57) ABSTRACT

Provided is an analysis device, including: a processor configured to implement an acquisition function of acquiring information indicating play events that are defined based on a motion of a user who plays a sport and arranged within a time interval, and a pattern estimation function of estimating a play pattern based on an arrangement of the play events.

13 Claims, 26 Drawing Sheets

FIG.4

| PlayEventID | EventType | Date/Time | SwingType | SwingSpeed(km/h) |
|---|---|---|---|---|
| 1 | Shot | 2013/10/16 19:02:37.43 | FHST | 37.79609 |
| 2 | Shot | 2013/10/16 19:02:41.96 | FHSL | 46.9776 |
| 3 | Shot | 2013/10/16 19:02:44.19 | FHST | 37.97023 |
| 4 | Shot | 2013/10/16 19:02:49.64 | FHST | 54.72831 |
| 5 | Shot | 2013/10/16 19:03:07.88 | NS | 46.56612 |
| 6 | Shot | 2013/10/16 19:03:10.02 | NS | 33.25354 |
| 7 | Shot | 2013/10/16 19:04:51.25 | BHST | 53.32578 |
| 8 | Shot | 2013/10/16 19:05:08.89 | BHSL | 56.41565 |
| 9 | Shot | 2013/10/16 19:10:30.97 | NS | 47.84306 |
| ... | ... | ... | ... | ... |
| 986 | Shot | 2013/10/16 20:10:39.30 | SMASH | 67.21655 |

| PlayEventID | EventType | SwingType | SwingSpeed(km/h) | Interval(s) |
|---|---|---|---|---|
| 1 | Shot | FHST | 37.79609 | 2 |
| 2 | Shot | FHSL | 46.9776 | 4 |
| 3 | Shot | FHST | 37.97023 | 3 |
| 4 | Shot | FHST | 54.72831 | 5 |
| 5 | Shot | NS | 46.56612 | 8 |
| 6 | Shot | NS | 33.25354 | 3 |
| 7 | Shot | BHST | 53.32578 | 29 |
| 8 | Shot | BHSL | 56.41565 | 17 |
| 9 | Shot | NS | 47.84306 | 322 |
| ... | ... | ... | ... | ... |
| 986 | Shot | SMASH | 67.21655 | 5 |

| PlayEventID | EventType | Player Name | Date | IP | Side | SwingType | SwingSpeed (km/h) | HiballSpeed (km/h) | Spin(RPM) |
|---|---|---|---|---|---|---|---|---|---|
| 1 | Shot | A | 2013/10/16 19:02:37.43 | 41 | A | FHST | 37.79609 | 23.58143 | -200 |
| 2 | Shot | A | 2013/10/16 19:02:41.96 | 40 | A | FHSL | 46.9776 | 31.58031 | -100 |
| 3 | Shot | A | 2013/10/16 19:02:44.19 | 46 | A | FHST | 37.97023 | 23.59426 | -200 |
| 4 | Shot | A | 2013/10/16 19:02:49.64 | 46 | B | FHST | 54.72831 | 38.23014 | 0 |
| 5 | Shot | A | 2013/10/16 19:03:07.88 | 45 | B | NS | 46.56612 | 31.79543 | -100 |
| 6 | Shot | A | 2013/10/16 19:03:10.02 | 39 | B | NS | 33.25354 | 19.16201 | -200 |
| 7 | Shot | A | 2013/10/16 19:04:51.25 | 39 | A | BHST | 53.32578 | 36.37471 | 0 |
| 8 | Shot | A | 2013/10/16 19:05:08.89 | 39 | A | BHSL | 56.41565 | 39.00726 | 0 |
| 9 | Shot | A | 2013/10/16 19:10:30.97 | 39 | A | NS | 47.84306 | 31.7365 | -600 |
| ... | ... | ... | ... | ... | ... | ... | ... | ... | ... |
| 986 | Shot | A | 2013/10/16 20:10:39.30 | 45 | B | SMASH | 67.21655 | 48.68976 | 400 |

| Segment ID | Sub-Segment ID | Segment Name | Sub-Segment Name | Description |
|---|---|---|---|---|
| 0 | 0 | Warm-up | - | WARM-UP |
| 1 | 0 | Practice | Rally | PRACTICE OF RALLY FORM |
| 1 | 1 | Practice | Shot Practice | SERVE PRACTICE, ETC. |
| 2 | 0 | Game | Singles | SINGLES MATCH |
| 2 | 1 | Game | Doubles | DOUBLES MATCH |

FIG.18

| PLAY PATTERN | | | | APPEARANCE FREQUENCY |
|---|---|---|---|---|
| SRV | | | | 18.4% |
| SRV | SRV | FHST | | 7.8% |
| SRV | BHVL | | | 4.4% |
| SRV | SRV | | | 3.1% |
| SRV | FHST | FHST | FHST | 2.1% |
| ... | | | | |
| SRV | FHSL | | | 1.0% |

⇕

| PLAY PATTERN | | | | APPEARANCE FREQUENCY |
|---|---|---|---|---|
| SRV | SRV | FHSL | BHVL | 12.4% |
| SRV | FHST | FHST | FHST | 6.8% |
| SRV | SRV | FHSL | FHST | 5.4% |
| SRV | SRV | FHST | FHST | 5.1% |
| SRV | SRV | BHSL | FHST | 3.1% |
| ... | | | | |
| SRV | | | | 0.5% |

FIG.21

| PLAY PATTERN | NUMBER OF APPEARANCES |
|---|---|
| P1 — FHST FHST FHST | 3 |
| P2 — BHST BHST BHST | 3 | ns
ANALYSIS DEVICE, RECORDING MEDIUM, AND ANALYSIS METHOD

CROSS REFERENCE TO RELATED APPLICATIONS

This application is a U.S. National Phase of International Patent Application No. PCT/JP2014/078116 filed on Oct. 22, 2014, which claims priority benefit of Japanese Patent Application No. JP 2013-273518 filed in the Japan Patent Office on Dec. 27, 2013. Each of the above-referenced applications is hereby incorporated herein by reference in its entirety.

TECHNICAL FIELD

The present disclosure relates to an analysis device, a recording medium, and an analysis method.

BACKGROUND ART

Techniques of assisting with a sports play using sensing or analysis have already been developed. For example, Patent Literature 1 discloses a technique of detecting a swing motion using detection data of a motion sensor, extracting data in which a swing motion is detected as swing candidate data, and selecting true swing data from swing candidate data based on a determination condition associated with a swing. Thus, for example, the user need not support a start timing and an end timing of a swing motion, and it is possible to extract swing data with a relatively small computational load.

CITATION LIST

Patent Literature

Patent Literature 1: JP 2012-254205A

SUMMARY OF INVENTION

Technical Problem

However, in the technique disclosed in Patent Literature 1, it is possible to analyze an individual swing, but acquired data is not analyzed as a series or a set. In order to improve in a sports play, it is important to analyze an individual play such as a swing and find points for improvement, but, for example, a series of plays configuring a game or a set are interrelated, and even if an individual play is focused on, influence of plays before and after it is unignorable. Further, it is difficult to understand a game or a combination of plays unless data acquired from a series of plays is analyzed as a series or a set.

In this regard, the present disclosure proposes an analysis device, a recording medium, and an analysis method, which are novel and improved and capable of analyzing data obtained from a series of sports plays as a series or a set.

Solution to Problem

According to the present disclosure, there is provided an analysis device, including: a processor configured to implement an acquisition function of acquiring information indicating play events that are defined based on a motion of a user who plays a sport and arranged within a time interval, and a pattern estimation function of estimating a play pattern based on an arrangement of the play events.

According to the present disclosure, there is provided a recording medium having a program stored therein, the program causing a computer to implement: an acquisition function of acquiring information indicating play events that are defined based on a motion of a user who plays a sport and arranged within a time interval; and a pattern estimation function of estimating a play pattern based on an arrangement of the play events.

According to the present disclosure, there is provided an analysis method, including: acquiring, by a processor, information indicating play events that are defined based on a motion of a user who plays a sport and arranged within a time interval; and estimating, by the processor, a play pattern based on an arrangement of the play events.

Advantageous Effects of Invention

As described above, according to the present disclosure, it is possible to analyze data obtained from a series of sports plays as a series or a set.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is a diagram illustrating an example of time-series event data in FIG. 3.

FIG. 5 is a diagram illustrating an example of time-series event data that has undergone preprocessing in FIG. 3.

FIG. 7 is a diagram illustrating another example of time-series event data according to an embodiment of the present disclosure.

FIG. 8 is a diagram illustrating an example of a segment definition according to an embodiment of the present disclosure.

FIG. 18 is a diagram for describing a comparison of users in the play style estimation process illustrated in an example of FIG. 17.

FIG. 21 is a diagram illustrating an example of a play pattern detected for a segment of stroke practice illustrated in FIG. 19.

DESCRIPTION OF EMBODIMENTS

Figure 1:
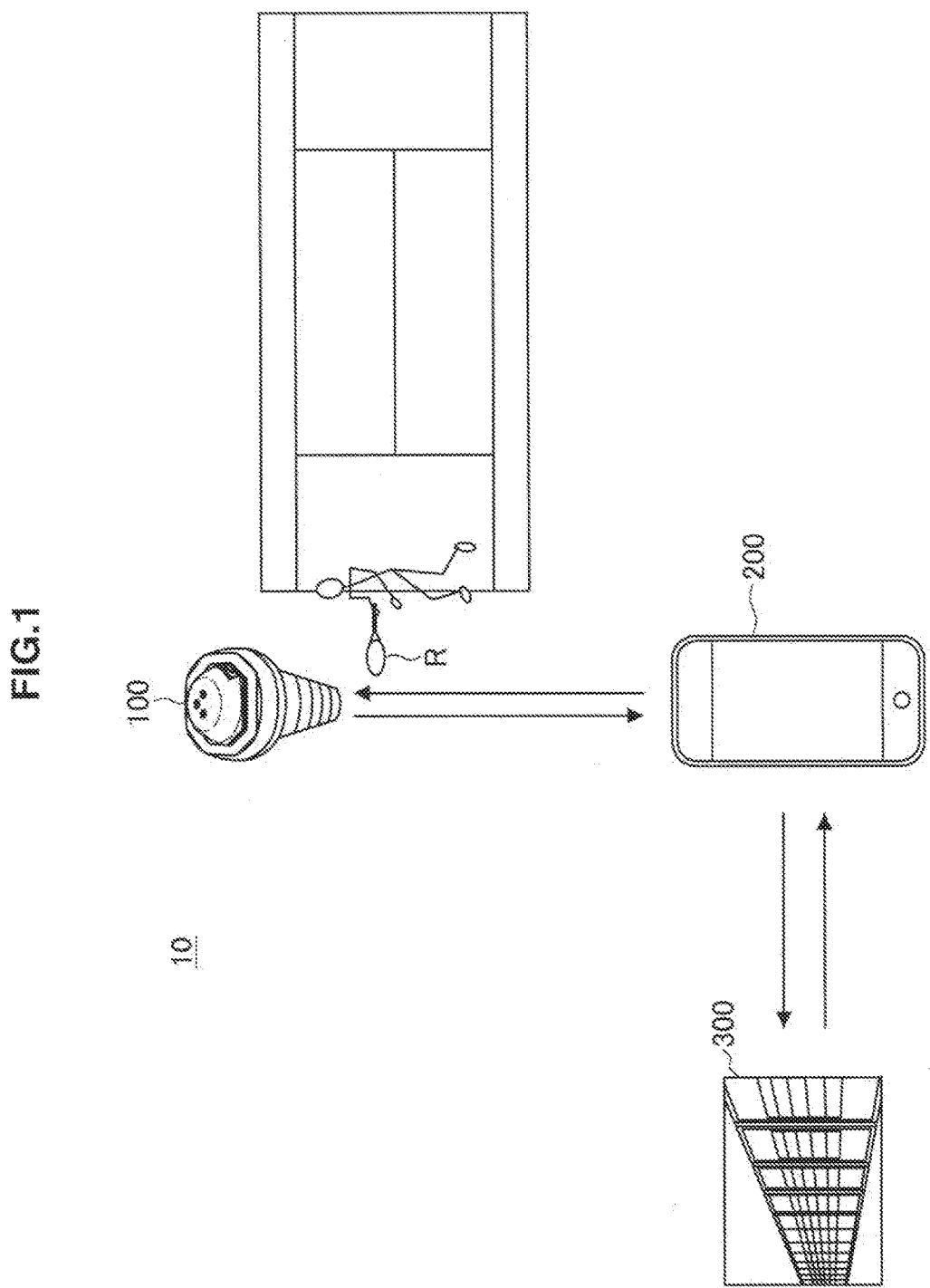
FIG. 1 is a diagram illustrating an example of a system configuration according to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. Introduction
2. System configuration
3. Segmentation
4. Estimation of play pattern
5. Analysis of practice segment
6. Examples of other sports
7. Hardware configurations
8. Supplement (1. Introduction)

Commonly, when a user plays a sport, it is segmented into, for example, a warm-up, practice, and a match. For example, a 2-hour play is segmented into a 20-minute warm-up, 1-hour practice, and a 40-minute match. A player's performance greatly differs according to each segment. For example, a player is considered not to move with full force when warming up, and a player's motion during practice differs from that during a match.

Thus, when data acquired in regard to a sports play is analyzed, it is considered important to consider, for example, the circumstances in which a player is performing the play. More specifically, when a degree of proficiency of a swing of a player is determined, it may be useful to remove data acquired during a warm-up or compare a difference between a swing during practice and a swing during a match.

In this regard, in the present technology, more useful analysis for acquired data is implemented such that data acquired in regard to a sports play is dealt with as information indicating play events arranged in terms of time, and, for example, the play events are classified as time-series segments corresponding to play units of the sport, or a play pattern is estimated based on an arrangement of the play events.

For example, when the motion of the user who plays a sport is detected using a motion sensor (an acceleration sensor, a gyro sensor, a geomagnetic sensor, or the like), detected data, metadata indicating an analysis result for the data, or the like can be accumulated as time-series data associated with the play. It is possible to provide various information associated with the play using the accumulated data.

In the present technology, for example, the play events indicated by the accumulated time-series data are classified into segments, and then the analysis is performed. For example, the play pattern is estimated from the play events indicated by the accumulated time-series data. Through such a configuration, useful information related to a sports play may be provided. The time-series data may be analyzed for each user or may be analyzed through a comparison of a plurality of users. For example, the data obtained from the analysis may be used for the user (player) to check the play or to give the user advice related to the play. Further, the data obtained from the analysis may be transmitted through social media and shared between users.

The following description will proceed with specific examples of sports such as tennis, but an application range of the present technology is not limited to the sports described below. For example, the present technology can be applied to any sport as long as a play event is defined based on a motion of the user who plays the sport.

(2. System Configuration)

FIG. 1 is a figure which shows an example of a system configuration according to an embodiment of the present disclosure. With reference to FIG. 1, the system 10 includes a sensor apparatus 100, a smart phone 200, and a server 300.

The sensor apparatus 100 is mounted in a tennis racket R. The sensor apparatus 100 includes, for example, a motion sensor (for example, an acceleration sensor, a gyro sensor, a geomagnetic sensor, or the like). In this case, the sensor apparatus 100 directly detects a motion of the racket R, but since the racket R is gripped by the user and moves according to the user's intention, it can be said that the sensor apparatus 100 detects the motion of the user indirectly through the motion of the racket R. In the present disclosure, in this case, it can be said that the sensor apparatus 100 is indirectly mounted on the user and detects the motion of the user.

In another embodiment, the sensor apparatus 100 may be mounted, for example, on clothing or a shoe of the user. In this case, the sensor apparatus 100 directly detects a motion of the clothing or the shoe, but since the clothing or the shoe moves with the user, it can be said that the sensor apparatus indirectly detects the motion of the user. Alternatively, the sensor apparatus 100 may be directly mounted on the user and, for example, may be put around an arm in a band form. In this case, the sensor apparatus 100 directly detects the motion of the user. In addition to when the sensor apparatus 100 directly detects the motion of the user, even when the sensor apparatus 100 indirectly detects the motion of the user, it is possible to define a play event corresponding to the motion of the user who plays a sport based on a detection result provided by the sensor apparatus 100 as long as the motion of the user is reflected in the detected motion.

The sensor apparatus 100 may further include a vibration sensor. For example, intervals (for example, intervals before and after an impact on a ball) corresponding to a play event can be easily specified based on data detected by the vibration sensor. Further, the data detected by the vibration sensor may be used for analysis of a play event as well, similarly to the data detected by the motion sensor. The sensor apparatus 100 may further include a sensor that acquires environmental information of the user who plays a sport such as a temperature, moisture, brightness, or a position. The data detected by various kinds of sensors with which the sensor apparatus 100 is equipped is preprocessed as necessary and then transmitted to the smart phone 200 through wireless communication such as Bluetooth (a registered trademark).

For example, the smart phone 200 is arranged near the user who is playing a sport. In this case, the smart phone 200 receives the data transmitted from the sensor apparatus 100 through wireless communication such as Bluetooth (a registered trademark), temporarily accumulates or processes the received data as necessary, and transmits the resulting data to the server 300 through network communication. The smart phone 200 may receive a result of analysis performed by the server 300 based on the transmitted data and output the analysis result to the user through a display, a speaker, or the like. The analysis result may be output when the user is not playing a sport. The output of the analysis result may be performed by an information processing terminal used by the user such as a personal computer or a tablet terminal, a game machine, a television, or the like, separately from the smart phone 200.

The smart phone 200 may not necessarily be arranged near the user who is playing a sport. In this case, the sensor apparatus 100 accumulates the detected data in an internal storage region (a memory or an external storage device). For example, the data may be transmitted from the sensor apparatus 100 to the smart phone 200 through wireless communication such as Bluetooth (a registered trademark) when the sensor apparatus 100 and the smart phone 200 approach each other after the sports play. Alternatively, the data may be transmitted when the sensor apparatus 100 is connected with the smart phone 200 in a wired manner such as USB after the sports play. Further, a removable recording medium may be used for the data transfer from the sensor apparatus 100 to the smart phone 200.

The server 300 communicates with the smart phone 200 via network, and receives the data detected by various kinds of sensors with which the sensor apparatus 100 is equipped. The server 300 performs an analysis process using the received data, and generates various information related to a sports play. For example, the server 300 defines a play event based on data that directly or indirectly indicates the motion of the user who plays a sport and is acquired by the motion sensor. For example, the play event corresponds to a single shot using the racket R. By defining the play event, for example, it is possible to understand plays of the user indicated by motion data as a sequence of plays having a meaning such as {serve, stroke, volley, . . . }.

Further, the server 300 may specify, for example, time-series segments into which play events are classified or a play pattern of the user estimated from a temporal arrangement of play events through the analysis process for the play events. For example, information generated by the analysis process of the server 300 is transmitted to the smart phone 200 and output toward the user through the display or the speaker of the smart phone 200. Alternatively, the server 300 may transmit the information to an information processing terminal other than the smart phone 200 and output information toward the user. The server 300 may perform the analysis process based on data received for each of a plurality of users, generate information based on a result of comparing, for example, play patterns generated for each user, and transmit the generated information to the information processing terminal of each user.

Figure 2:
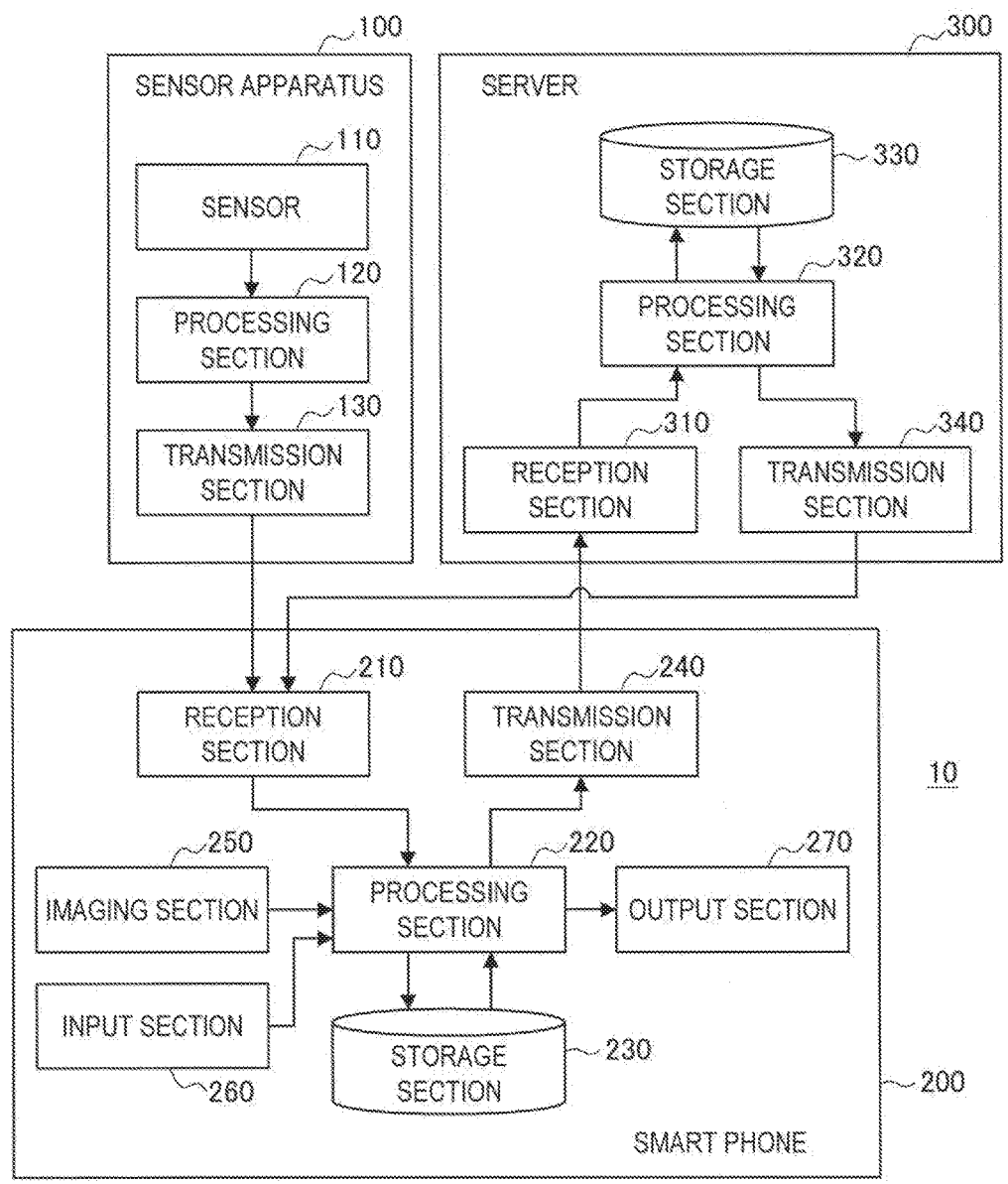
FIG. 2 is a block diagram schematically illustrating a device configuration of a system according to an embodiment of the present disclosure.

FIG. 2 is a block diagram schematically illustrating a device configuration of a system according to an embodiment of the present disclosure. Referring to FIG. 2, the sensor apparatus 100 includes a sensor 110, a processing section 120, and a transmission section 130. The smart phone 200 includes a reception section 210, a processing section 220, a storage section 230, a transmission section 240, an imaging section 250, an input section 260, and an output section 270. The server 300 includes a reception section 310, a processing section 320, a storage section 330, and a transmission section 340. Hardware configuration examples (hardware configuration examples of the sensor apparatus and the analysis device and the analysis device) for implementing the respective devices will be described later.

In the sensor apparatus 100, the processing section 120 processes the data acquired by the sensor 110, and the transmission section 130 transmits the processed data to the smart phone 200. The sensor 110 includes, for example, the motion sensor that directly or indirectly detects the motion of the user who plays the sport as described above. The sensor 110 may further include the vibration sensor, a sensor for acquiring the environmental information of the user, or the like. The processing section 120 is implemented by a processor that operates according to a program, and performs preprocessing on the data acquired by the sensor 110 as necessary. The preprocessing may include, for example, sampling, noise reduction, or the like. The preprocessing may not necessarily be performed. The transmission section 130 is implemented by a communication device, and transmits the data to the smart phone 200, for example, using wireless communication such as Bluetooth (a registered trademark). Although not illustrated in FIG. 2, the sensor apparatus 100 may include a storage section that temporarily accumulates data.

In the smart phone 200, the reception section 210 receives the data transmitted by the sensor apparatus 100, and the transmission section 240 transmits data to the server 300. The reception section 210 and the transmission section 240 are implemented by a communication device that performs, for example, wireless communication such as Bluetooth (a registered trademark) and wired or wireless network communication. The received data is temporarily stored in the storage section 230 and then transmitted, for example, through the processing section 220. The processing section 220 may perform preprocessing on the received data. The processing section 220 is implemented by a processor that operates according to a program, and the storage section 230 is implemented by a memory or a storage. The reception section 210 may further receive information transmitted from the server 300. For example, the received information may be output toward the user from the output section 270 according to control of the processing section 220. The output section 270 includes, for example, a display or a speaker.

Further, in the smart phone 200, the imaging section 250 acquires an image. For example, the imaging section 250 is implemented by a camera module in which an imaging element is combined with an optical system such as a lens. The image may include the user who plays a sport as a subject. For example, the image acquired by the imaging section 250 is transmitted from the transmission section 240 to the server 300 together with the data received through the reception section 210. For example, the server 300 may use the image for the analysis process together with the data acquired by the sensor apparatus 100 or may embed the image in information generated by the analysis process. The input section 260 includes, for example, a touch panel, a hardware button, a microphone that receives an audio input, and/or a camera that receives a gesture input. The processing section 220 may request the server 300 to transmit information through the transmission section 240 according to a user operation acquired through the input section 260.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

The configuration of the system according to an embodiment of the present disclosure has been described above. The above-described configuration is an example, and various modifications can be made in other embodiments. For example, in the above example, the analysis process using the data acquired by the sensor apparatus 100 is performed by the processing section 320 of the server 300, but the analysis process may be performed by the processing section 220 of the smart phone 200 or the processing section 120 of the sensor apparatus 100. The system 10 has been described as including the sensor apparatus 100, the smart phone 200, and the server 300, but, for example, when the processing section 220 of the smart phone 200 performs the analysis process, the system 10 may not include the server 300. Alternatively, in this case, the server 300 provides a service of storing the information obtained by the analysis process and sharing the information with the user. Further, for example, when the processing section 120 of the sensor apparatus 100 performs the analysis process, the system 10 may not include the smart phone 200 and the server 300. The sensor apparatus 100 may be, for example, a dedicated sensor apparatus mounted on the user or a tool, or a sensor module mounted in a portable information processing terminal may function as the sensor apparatus 100. Thus, the sensor apparatus 100 may be implemented in the same apparatus as the smart phone 200.

(3. Segmentation)

Several examples of the analysis process according to the present embodiment will be more specifically described below. The analysis process described below is performed by a processor unless otherwise set forth herein. As described above, the processor that performs the analysis process corresponds to the processing section 320 of the server 300, the processing section 220 of the smart phone 200, and/or the processing section 120 of the sensor apparatus 100 illustrated in FIG. 2.

Figure 3:
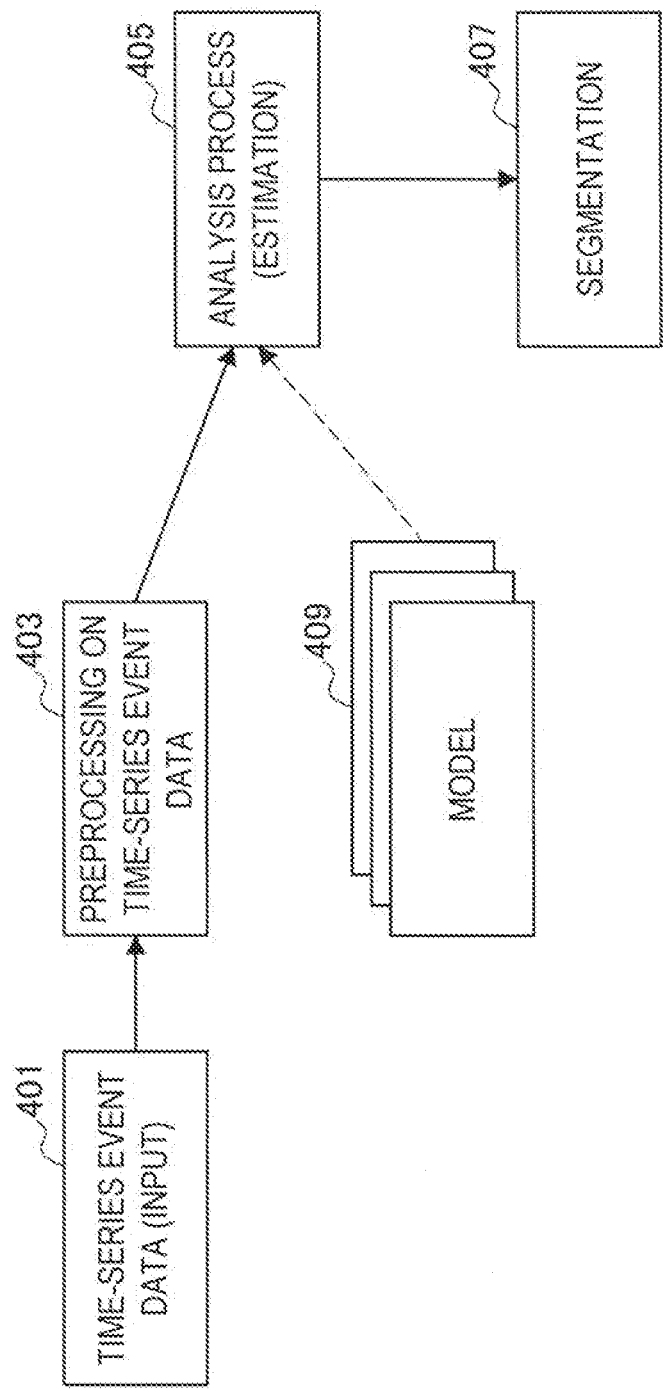
FIG. 3 is a diagram for describing segmentation according to an embodiment of the present disclosure.

FIG. 3 is a diagram for describing segmentation according to an embodiment of the present disclosure. Referring to FIG. 3, in the segmentation, time-series event data 401 is used as an input. The time-series event data 401 is information that is defined based on the motion of the user who plays the sport and indicates play events that are temporally arranged. The processor that performs the analysis process implements a function of acquiring such information, for example, the time-series event data 401. For example, the processor may receive the time-series event data 401 generated by a processor of another device. Alternatively, the processor may implement a function of receiving the detection result of the motion of the user by the sensor (for example, the sensor 110 with which the sensor apparatus 100 is equipped) directly or indirectly mounted on the user and a function of defining the play event based on the detection result.

In the following description, the time-series event data used as an input is assumed to be as follows:

$$\{X_i\}_{i=1, \ldots, N}$$

N indicates the number of play events included in a time series. The play event is defined for each shot, for example, a tennis play. In this case, for example, motion data of the user who is playing, which is acquired by the motion sensor included in the sensor 110 of the sensor apparatus 100, is compared with a feature of a motion of each shot such as serve, stroke, or smash, and when a corresponding motion is detected, a play event is defined for a corresponding interval. Since the motion data is time-series data, the play events are also temporally arranged. Individual time-series event data $X_i$ includes an analysis result such as a time of a shot, a swing type, a swing speed, a ball speed, or a position on a racket at which an impact on a ball occurs.

In the illustrated example, preprocessing 403 is performed on the time-series event data $\{X_i\}$. In the following description, the time-series event data that has undergone the preprocessing 403 is as follows:

$$\{X\sim_i\}_{i=1, \ldots, N}$$

The preprocessing 403 may include, for example, a process of calculating a period of time $t(X_{i+1}-X_i)$ between shots based on occurrence times $t(X_i)$ and $t(X_{i+1})$ of the play events (shots) and adding the time $t(X_{i+1}-X_i)$ as one of attributes of the time-series event data $X\sim_i$.

Then, the analysis process 405 is performed on the time-series event data $\{X\sim_i\}$ that has undergone the preprocessing, and segmentation 407 is output. In the following description, a time series of segments decided for the time-series event data $X\sim_i$ according to the segmentation 407 is assumed to be as follows:

$$Y=\{Y_i\}_{i=1, \ldots, N}$$

The respective segments $Y_i$ are a match, a warm-up, practice, and the like, for example, in the case of tennis. The segment $Y_i$ of the match is an example of a time-series segment corresponding to a play unit of a sport. In the present embodiment, the processor that performs the analysis process classifies the play event as a segment based on a temporal arrangement of the play events such as an anteroposterior relation between play events or time intervals thereof. The play unit refers to a unit specifying a sports play according to a predetermined rule such as a match, a set in a match, a game in a set, or a rally in a game, for example, in the case of tennis. The processor that performs the analysis process may classify the play event as a segment corresponding to a play unit, for example, according to a rule of a sport which is given in advance or may extract a feature of an arrangement of play event for each play unit and classifying the play event as a segment corresponding to the play unit.

In the analysis process 405, a time series Y of a segment is estimated using a model 409. Here, the model 409 gives a conditional probability of the time series Y of the segment in a situation in which the time-series event data $X\sim=\{X\sim i\}i=1, \ldots, N$ that has undergone the preprocessing is given and is indicated by $p(Yi|X\sim i)$. In the illustrated example, probabilities of all patterns of the time series Y of the segment are calculated by the model 409. For example, when the segment Yi is any one of a match, a warm-up, and practice, the time series Y of the segment has 3N patterns.

Here, the model 409 is indicated, for example, by the following Formula. This model is also referred to as a "hidden Markov model (HMM)."

[Math. 1]

$$p(\tilde{X}, Y) = \sum_{S=\{s_i\}} \prod_i P(\tilde{X}_i | s_i) P(Y_i | s_i) P(s_i) \quad \text{(Formula 1)}$$

Here, s is a variable (for example, 1, 2, ..., 100) having a discrete value. In this case, "a model is given" means that values of $p(X\sim_i|s_i)$, $p(Y_i|s_i)$, and $p(s_i)$ on the right side of Formula 1 are given as functions of x, y, and s. For example, these values are given by a certain parameter θ. Thus, "when a model is given," a probability $p(X\sim_i, Y_i)$ of an arbitrary pair $X\sim_i$ and $Y_i$ can be calculated using Formula 1.

In the analysis process 405, the time series Y of the segment having the highest probability calculated using the model 409 is employed as an estimated time series of a segment. This is written as follows:

$$Y_{estimated} = \text{argmax}_Y p(Y|X\sim)$$

$Y_{estimated}$ can be decided based on the probability $p(X\sim_i, Y_i)$ calculated using Formula 1 since $\text{argmax}_Y p(Y|X\sim) = \text{argmax}_Y p(X\sim, Y)$ according to a definition of a well-known conditional probability. When the model 409 is the HMM, Y that is optimal can be effectively obtained using an algorithm called dynamic programming.

FIG. 4 is a diagram illustrating an example of the time-series event data in FIG. 3. In the example illustrated in FIG. 4, the time-series event data 401 includes items of an event ID, an event type, a date and time, a swing type, and a swing speed. The event ID is an ID identifying each piece of data uniquely. The event type is set to "shot" for all illustrated data. This indicates that the data is data for a play event of "shot." In the case of tennis described below as an example, segment classification and play pattern estimation are performed based on a play event of a type of "shot," and in another example of tennis or examples of other sports, a play event of a type other than "shot" such as "jump" or "run" may be defined.

The date and time indicates a date and time at which a play event corresponding to each piece of data occurred. Here, a time at which a play event occurred may be, for example, a time at which detection of a motion of the user specified as a play event started or may be a characteristic time in a play event such as an impact time of a racket on a ball in the case of a play event of "shot." The swing type indicates a swing type of a shot specified based on motion data. Abbreviations used in the swing type are as follows.

TABLE 1

| Main Class | Sub Class | Abbreviation |
|---|---|---|
| FOREHAND | STROKE | FHST |
|  | SLICE | FHSL |
|  | VOLLEY | FHVL |
| BACKHAND | STROKE | BHST |
|  | SLICE | BHSL |
|  | VOLLEY | BHVL |
| OVERHAND | SMASH | SMSH |
|  | SERVE | SRV |
| — | NOT SWING | NS |

NS (Not Swing) indicates, for example, a play event in which an impact of a racket on a ball is detected by the vibration sensor or the like, and a series of motions corresponding to an impact is also detected from motion data, but it is hard to determine whether or not a swing is a corresponding type of swing. The swing speed indicates, for example, a speed of a racket at the time of an impact which is calculated based on motion data before and after the impact.

FIG. 5 is a diagram illustrating an example of the time-series event data that has undergone the preprocessing in FIG. 3. In the example illustrated in FIG. 5, time-series event data 403a that has undergone the preprocessing includes items of an event ID, an event type, a swing type, a swing speed, and a time difference (an interval). In the illustrated example, in the preprocessing of the time-series event data, a time difference (interval) between play events is calculated based on the date and time. The time difference indicates a temporal arrangement of play events (a time interval of preceding and subsequent play events) and may be used, for example, for segment estimation in the analysis process 405.

Figure 6:
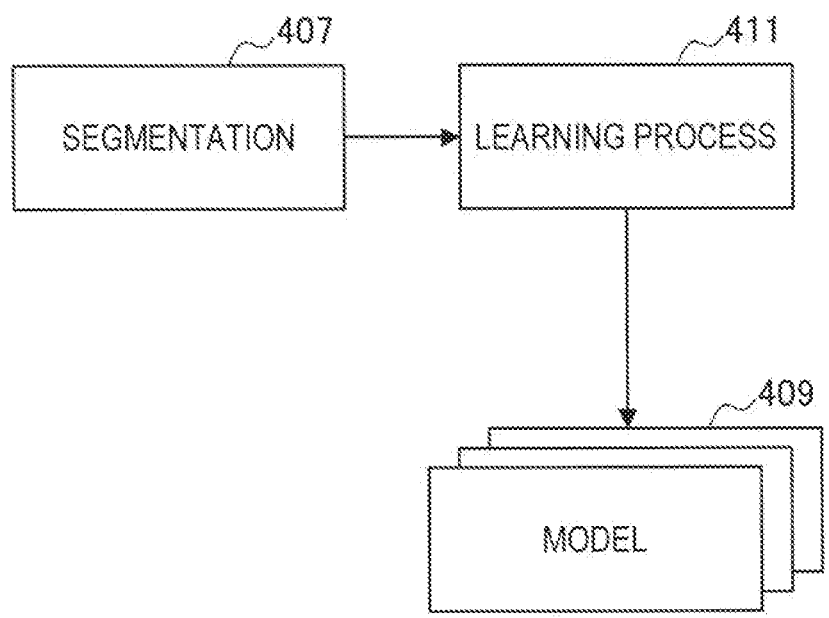
FIG. 6 is a diagram for describing model learning for segmentation according to an embodiment of the present disclosure.

FIG. 6 is a diagram for describing model learning for segmentation according to an embodiment of the present disclosure. In the example of FIG. 3, the model 409 has been described as being given, but the model may be generated through learning of segmentation that has already been performed. Referring to FIG. 6, a learning process 411 may generate the model 409 based on segmentation 407 of an event time series.

Here, the segmentation 407 of the event time series is indicated by $(Xm, Ym) m=1, \ldots, M$, and includes M pieces of time-series event data X, each of which is classified as the segment Y. The learning process 411 may be, for example, an EM algorithm. The model 409 may be expressed, for example, using a parameter θ.

For example, when the model 409 is expressed using the parameter θ, if the model is a Gaussian HMM, θ is expressed as in the following Formula 2.

[MATH. 2]

$$P(\tilde{X}|s) = N(\mu_s, \sigma_s^2),$$

$$\theta = \{\mu_s, \sigma_s^2, P(s), \{P(Y|s)\}_Y\}_s \quad \text{(Formula 2)}$$

A process of obtaining a better probability distribution by adjusting the value of the parameter θ is referred to as "learning." Thus, the value of the parameter θ to be estimated is expressed as in the following Formula 3. For example, the EM algorithm is used as an algorithm for obtaining the value of θ expressed in this way approximately.

[Math. 3]

$$\theta_{estimated} = \mathrm{argmax}_\theta \sum_m \log P(\tilde{X}^{(m)}, Y^{(m)})$$ (Formula 3)

FIG. 7 is a diagram illustrating another example of the time-series event data according to an embodiment of the present disclosure. Referring to FIG. 7, time-series event data 401a includes items of a play event ID, an event type, a player name, a date and time, an impact point (IP), a side (a front side or a back side of a racket), a swing type, a swing speed, a hit ball speed, and a spin. The impact point, the side, the hit ball speed, and the spin can be calculated, for example, based on a vibration of the racket acquired by the vibration sensor included in the sensor 110 with which the sensor apparatus 100 is equipped and a motion of the racket acquired by the motion sensor.

FIG. 8 is a diagram illustrating an example of a segment definition according to an embodiment of the present disclosure. Referring to FIG. 8, data 407a defining a segment includes items of a segment ID, a sub-segment ID, a segment name, a sub-segment name, and a description. As will be described later, in the present embodiment, a segment may be hierarchically defined. In this case, for example, a segment is identified by a combination of the segment ID and the sub-segment ID as in the data 407a illustrated in FIG. 8. For example, it is possible to present a segment so that the user can easily understand it by defining names and descriptions of a segment and a sub-segment.

Figure 9:
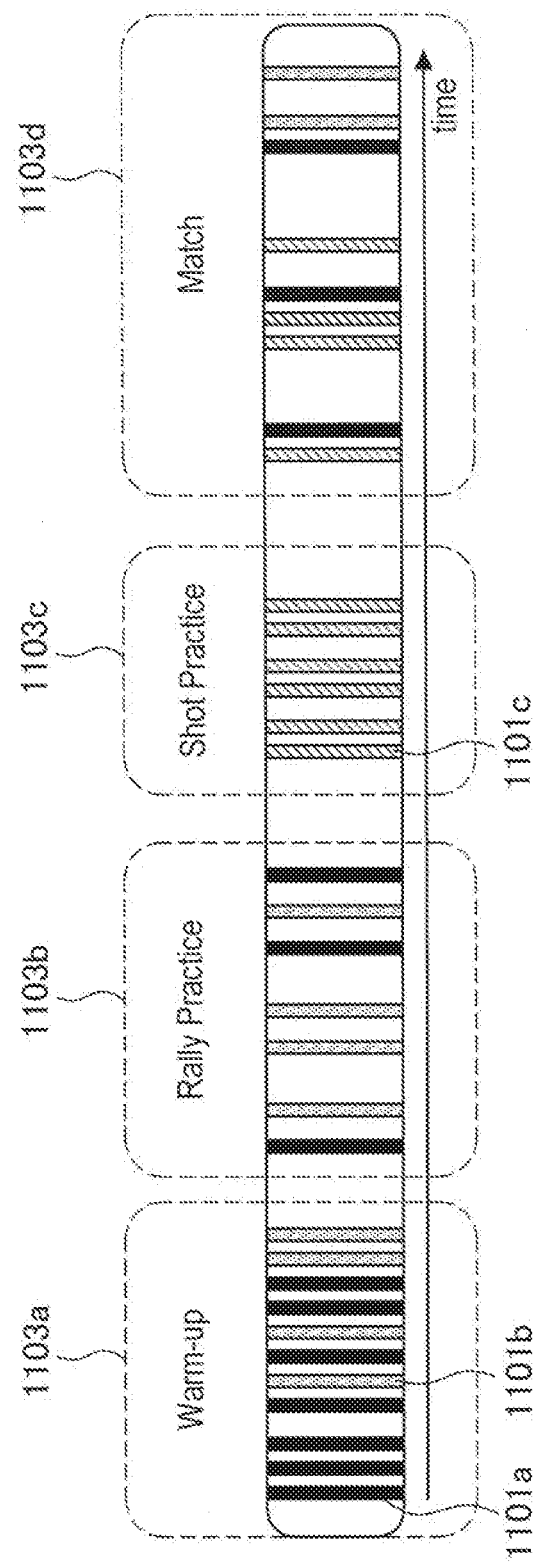
FIG. 9 is a diagram illustrating a specific example of segmentation according to an embodiment of the present disclosure.

FIG. 9 is a diagram illustrating a specific example of segmentation according to an embodiment of the present disclosure. Referring to FIG. 9, a time series including three types of play events 1101 is classified into four segments 1103. More specifically, the play event 1101 includes a play event 1101a of a forehand shot (a stroke, a slice, or a volley), a play event 1101b of a backhand shot, and a play event 1101c of an overhand shot (a serve or a smash). The play event 1101 may be more narrowly classified (for example, the play event 1101a may be classified as a forehand stroke, a forehand slice, or a forehand volley). The segment 1103 includes a segment 1103a of a warm-up, a segment 1103b of rally practice, a segment 1103c of shot practice, and a segment 1103d of a match.

For example, in the above example, the segment 1103a of the warm-up may be determined from features in which shot intervals are short, a sequence of characteristic play events such as a mini rally or a volley-volley is shown, and the swing speed is slow. The segment 1103b of the rally practice may be determined from features in which shot intervals are slightly long, the number of strokes is large, and the swing speed is relatively fast. The segment 1103c of the shot practice may be determined based on features in which swings occur consecutively, and shots of 3 balls, 5 balls, 10 balls, or the like occur together. The segment 1101d of the match may be determined from features in which there is a series of shots starting from a serve, intervals between two such series of shots are long, and a series of shots starting from a serve and a series of shots starting from a return alternately occur.

As in the above example, in the present embodiment, the play events are classified into segments based on a temporal arrangement thereof, that is, an anteroposterior relation thereof, time intervals thereof, or the like. Further, the play events may be classified into segments based on a feature of a corresponding motion such as the swing speed.

Figure 10:
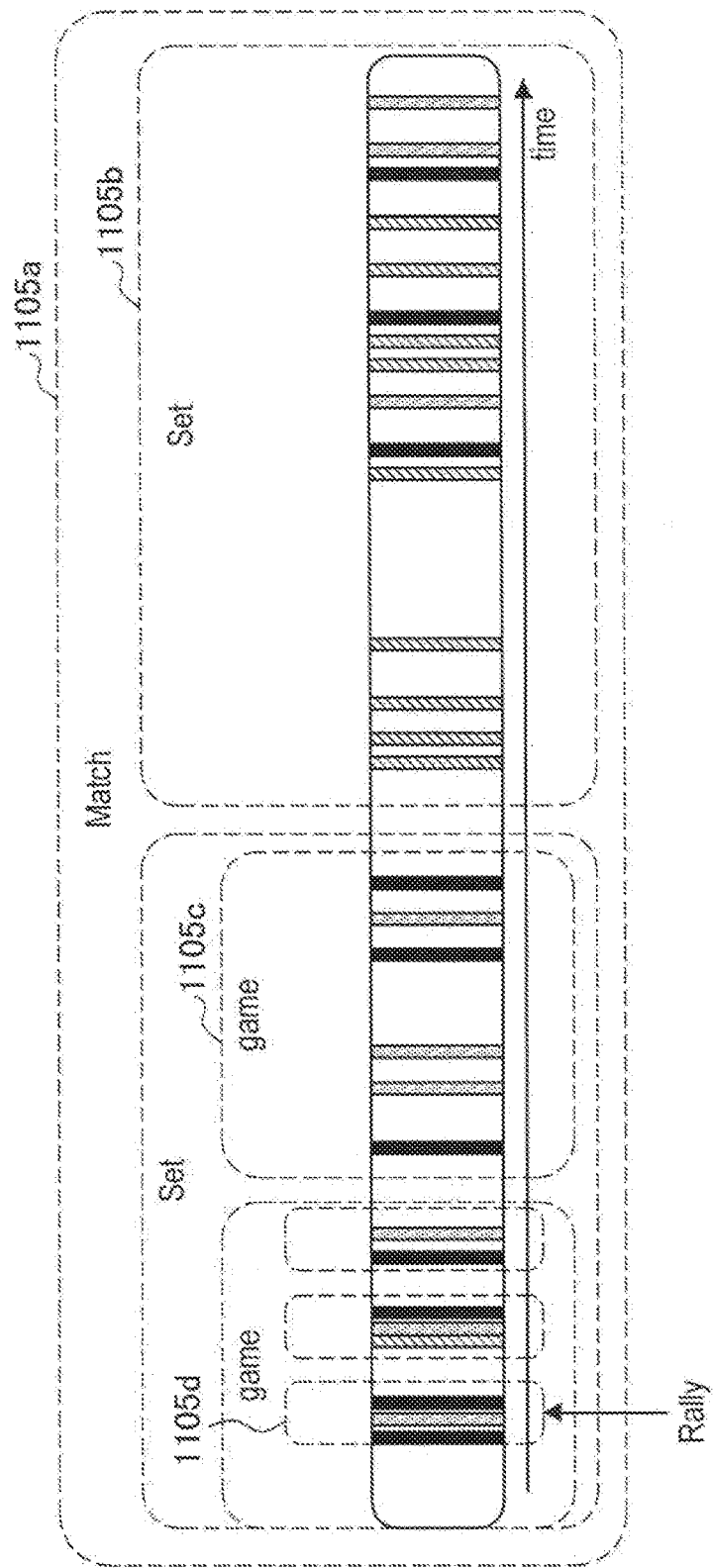
FIG. 10 is a diagram illustrating an example of hierarchical segmentation according to an embodiment of the present disclosure.

FIG. 10 is a diagram illustrating an example of hierarchical segmentation according to an embodiment of the present disclosure. For example, in the segment 1103d of the match in the example illustrated in FIG. 9, a hierarchical structure of the segment can be made by defining the segment for each play unit more narrowly. As an example, FIG. 10 illustrates hierarchical segment 1105. The segments 1105 includes a segment 1105a of a match, segments 1105b of sets, segments 1105c of games, and segments 1105d of rallies. The segment 1105a of the match includes the segments 1105b of several sets, the segments 1105b of the sets each include the segments 1105c of several games, and the segments 1105c of the games each include the segments 1105d of several rallies.

As in the above example, in the present embodiment, the play events are classified into hierarchical segments. In this case, the play events are classified into segments based on the above-described temporal arrangement and may be classified into segments based on a rule of a sport. In the above example, configuring each of the segments 1105c of the games with the segments 1105d of several rallies, configuring each of the segments 1105b of the sets with the segments 1105c of several games, and configuring the segment 1105a of the match with the segments 1105b of several sets may be given as a rule in advance at the time of segment estimation or model generation.

Figure 11:
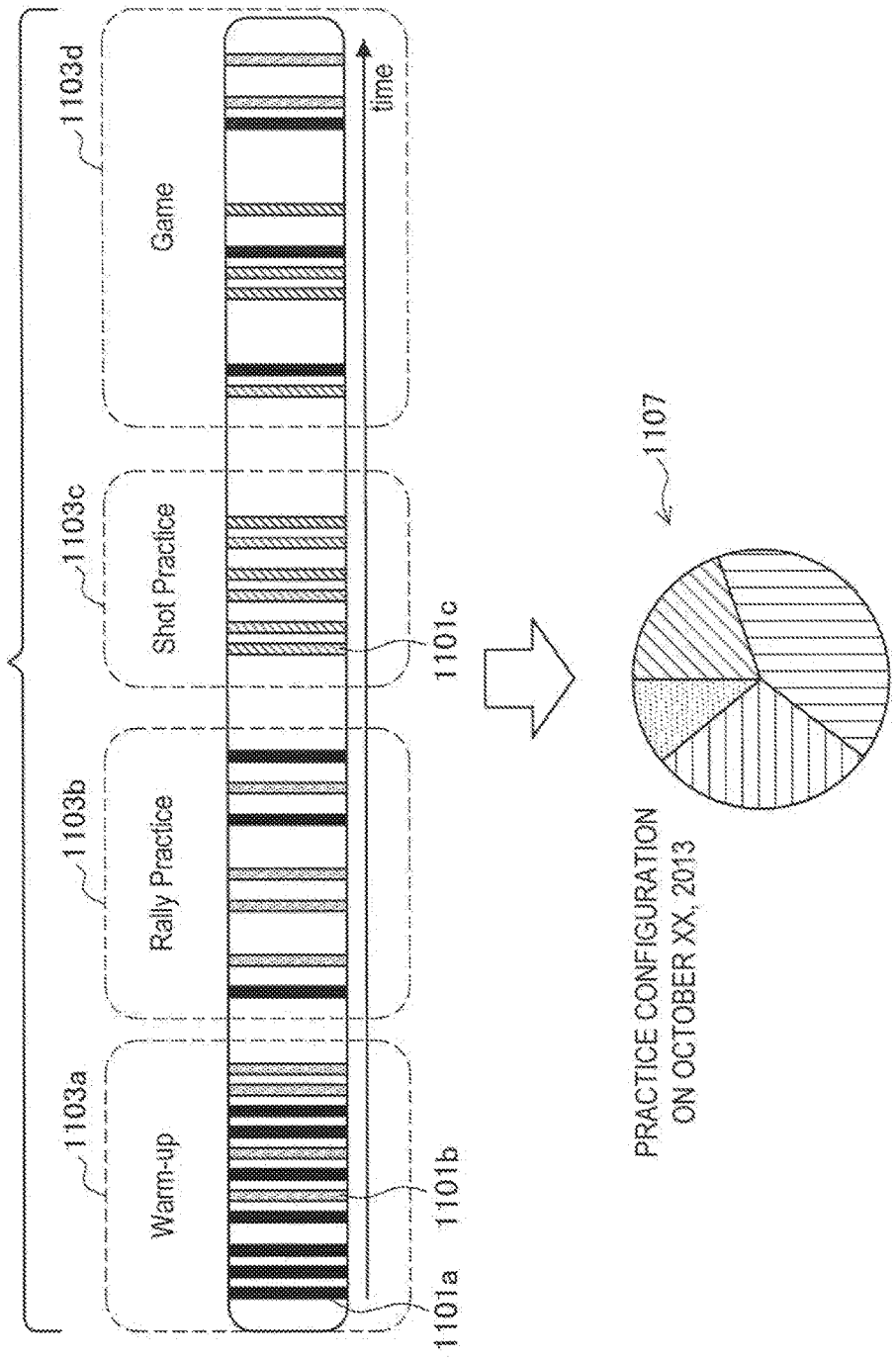
FIG. 11 is a diagram illustrating an example of information obtained from segmentation according to an embodiment of the present disclosure.

FIG. 11 is a diagram illustrating an example of information obtained from segmentation according to an embodiment of the present disclosure. In the example illustrated in FIG. 11, information 1107 indicating a one-day practice configuration is generated based on a result of classifying play events included in one-day practice data of the user into segments. For example, the information 1107 indicates a play of the user in the one-day practice by dividing it into times of a warm-up, practice, a game, a break, and the like.

Here, the information obtained from the segmentation can be more useful information, for example, as segments correspond to play units of a sport. For example, information such as a success rate of a first serve or the number of continued rallies can be more useful information by removing data of segments of practice and extracting only segments of matches. From a segment that does not necessarily correspond to a play unit of a sport, for example, a segment of a warm-up, more useful information indicating a degree of a warm-up may be obtained.

(4. Estimation of Play Pattern)

Figure 12:
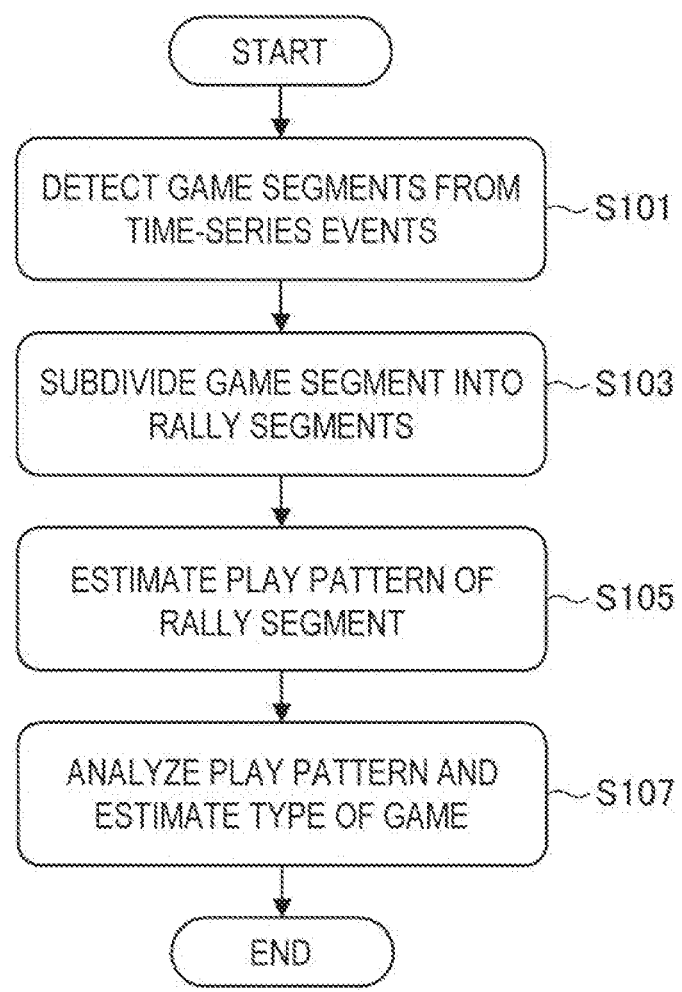
FIG. 12 is a flowchart illustrating an example of a play pattern estimation process according to an embodiment of the present disclosure.

FIG. 12 is a flowchart illustrating an example of a play pattern estimation process according to an embodiment of the present disclosure. Referring to FIG. 12, the processor that performs the analysis process classifies time-series event data into game segments (S101). The time-series event data is, for example, data presented with reference to FIG. 4 or 7 and indicates play events corresponding to shots in tennis. The game segment is, for example, the segment described with reference to FIG. 10 and is configured with several rally segments. Further, a set segment is configured with several game segments.

A segment from which the hierarchical segment illustrated in FIG. 10 is specified, that is, one of an upper level segment (for example, the match segment), a lower level segment (for example, the rally segment), and an intermediate level segment (for example, the game segment) may be arbitrarily set, for example, according to an algorithm used in the analysis process 405 illustrated in FIG. 3.

Then, the processor that performs the analysis process subdivides the game segment into the rally segments (S103). In the illustrated example, by recursively performing an algorithm used for specifying a segment (the game segment) of a certain layer within the segment, a segment (the rally segment) of a lower layer is specified. Such a segmentation process is an example, and, for example, a different algorithm from an algorithm for specifying a segment of an upper layer may be used to specify a segment of a lower layer. In the illustrated example, through the process of S103, a play event (for example, a swing that is a practice swing or the like) that does not relate to a point of a game in the game segment is not included in the rally segment and is thus excluded as an analysis target.

Then, the processor that performs the analysis process estimates a play pattern of the segment based on an arrangement of the play events in the rally segment (S105). In the illustrated example, the play pattern is a pattern indicating a configuration of the play events (shots) in the rally. For example, in the case of tennis, in a service game, the rally segment starts from a serve, and in a receive game, the rally segment starts from a shot other than a serve, and thus these games differ in the configurations of shots included in the rally segment. A specific example of the play pattern will be described later.

Then, the processor that performs the analysis process analyzes the play pattern estimated for the rally segment, and estimates a type of the game (S107). As described above, the game segment is configured with a plurality of rally segments. A type of the game segment serving as the upper level segment can be estimated based on the play patterns estimated for the respective rally segments. The type of the game may correspond to, for example, the service game and the receive game.

Next, the play pattern estimation process illustrated in the flowchart of FIG. 12 will be further described using a more specific example.

Figure 13:
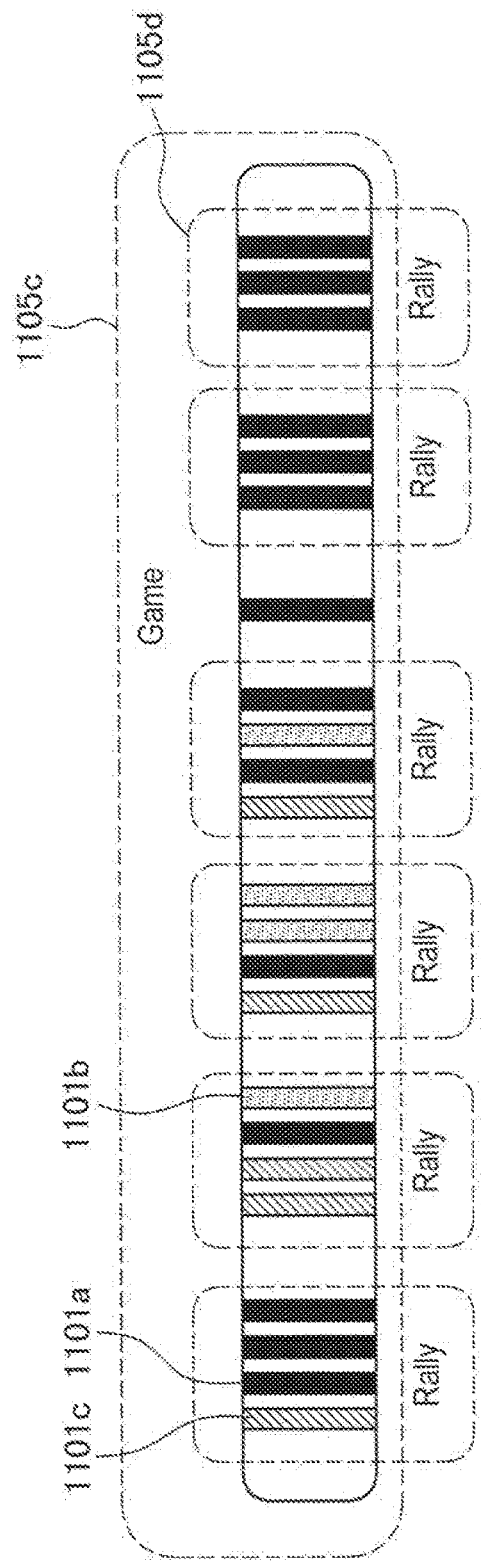
FIG. 13 is a diagram illustrating an example of a play event segmented in the process of FIG. 12.

FIG. 13 is a diagram illustrating an example of the play events segmented in the process of FIG. 12. Referring to FIG. 13, a time series configured with play events 1101 is classified as one game segment 1105c. The game segment 1105c is subdivided into six rally segments 1105d. The play event 1101 illustrated in FIG. 13 is the same as the play event illustrated in FIG. 9, and includes a play event 1101a of a forehand shot, a play event 1101b of a backhand shot, and a play event 1101c of an overhand shot. The example in which the play events are classified into three types is illustrated in FIG. 13, but in practice, the play event 1101 may be more narrowly classified. In the following description, the play event 1101c of the overhand shot is assumed to correspond to a serve.

A play pattern of the rally segment 1105d may be estimated, for example, by specifying an arrangement of the play events in the rally segments 1105d as a pattern. In other words, in a first rally segment 1105d illustrated in FIG. 13, a play pattern of "serve (the play event 1101c)—forehand (the play event 1101a)—forehand—forehand" is estimated. In a second rally segment 1105d, a play pattern of "serve (the play event 1101c)—serve—forehand (the play event 1101a)—backhand (the play event 1101b)" is estimated.

Figure 14:
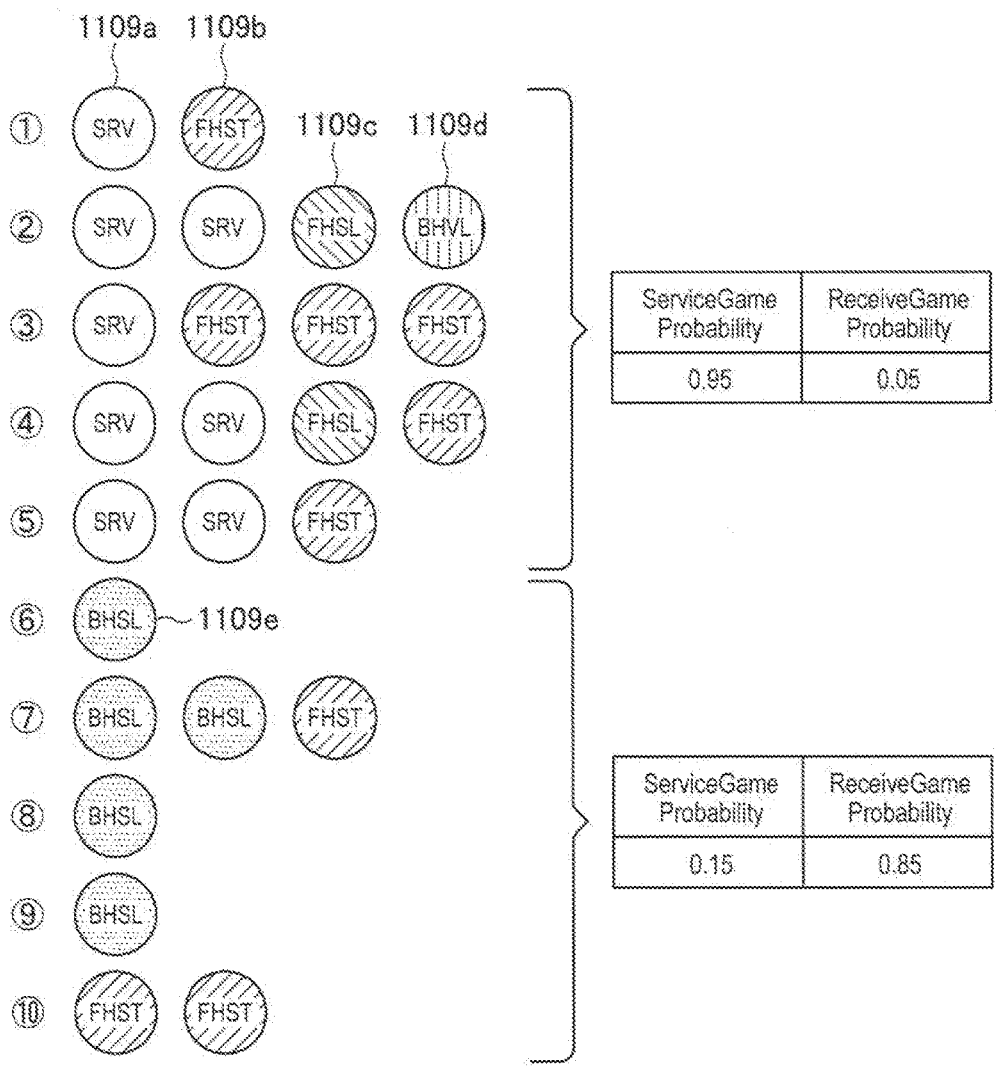
FIG. 14 is a diagram illustrating an example of game type estimation based on a play pattern in the process of FIG. 12.

FIG. 14 is a diagram illustrating an example of an estimation of a type of a game based on the play pattern in the process of FIG. 12. FIG. 14 illustrates an arrangement of play events 1109 extracted for rally segments (indicated by numbers 1 to 10). In the illustrated example, the play events 1109 include a serve 1109a, a forehand stroke 1109b, a forehand slice 1109c, a backhand volley 1109d, and a backhand slice 1109e.

Here, all the first to fifth rally segments start from the serve 1109a. The processor that performs the analysis process determines that a probability that the games including the five rally segments will be service games is high (0.95) through an algorithm configured based on a rule of tennis (that, in the service game, all games start with the serve of the one player).

On the other hand, all the sixth to tenth rally segments start from the play event other than the serve 1109a. The processor that performs the analysis process determines that a probability that the games including the five rally segments will be service games of the other player, that is, receive games, is high (0.85) through the algorithm configured based on the rule of tennis.

Figure 15:
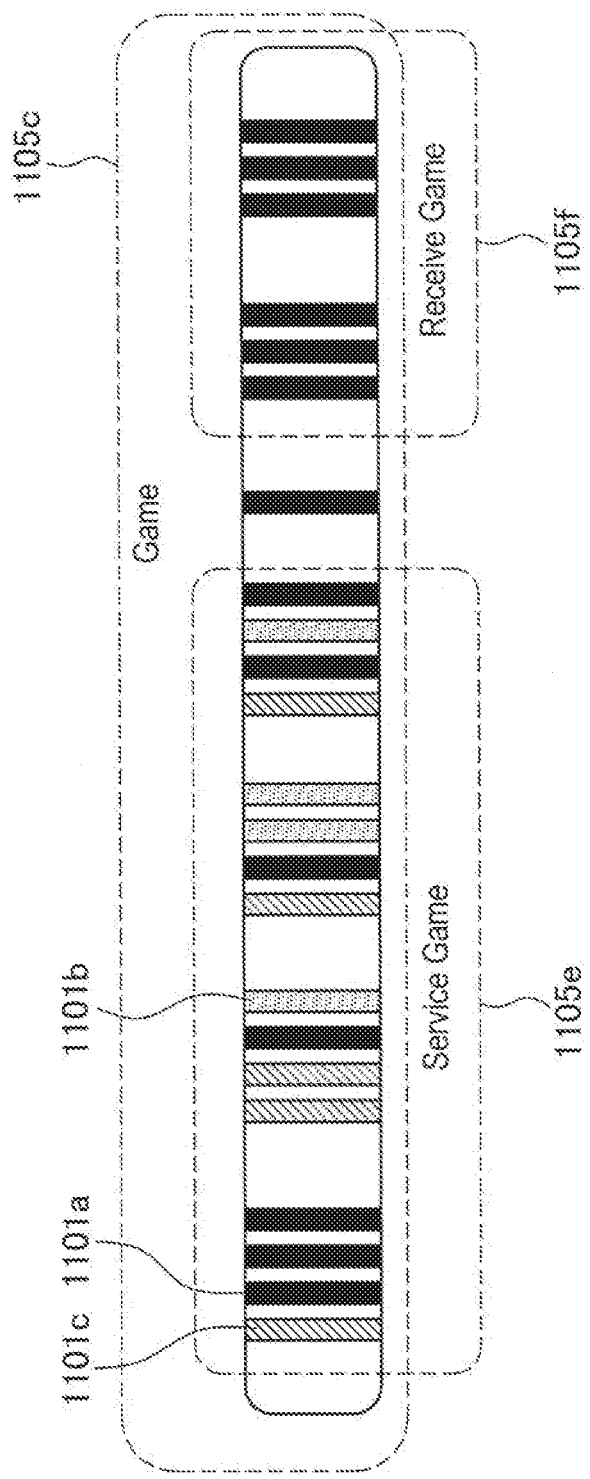
FIG. 15 is a diagram illustrating an example of a play event reclassified based on an estimation result in the process of FIG. 12.

FIG. 15 is a diagram illustrating an example of the play events reclassified based on the estimation result in the process of FIG. 12. Referring to FIG. 15, the time series configured with the same play events 1101 as those illustrated in FIG. 13 is reclassified into a segment 1105e of the service game and a segment 1105f of the receive game based on the estimation result of the game type. Here, the segments 1105e and 1105f may be defined as segments for replacing the rally segments 1105d illustrated in FIG. 13 or may be defined as segments of an intermediate layer between the rally segments 1105d and the game segments 1105c.

The example described above with reference to FIGS. 12 to 15 is an example in which the play events are classified into time-series segments (which may have a hierarchical structure) corresponding to the play units of the sport based on the temporal arrangement thereof, the play pattern is estimated based on an arrangement of the play events in the segment, and the type of the play unit (for example, a game, a rally, or the like) corresponding to the segment is designated based on the play pattern. The process of classifying the play events into the segments and the process of estimating the play pattern need not necessarily be performed in the same system. In other words, the play events may be classified into the segments in a first system, and the play pattern may be estimated based on the arrangement of the play events in a second system that is supplied with the result. In this case, both the first system and the second system may be independent embodiments of the present disclosure.

Figure 16:
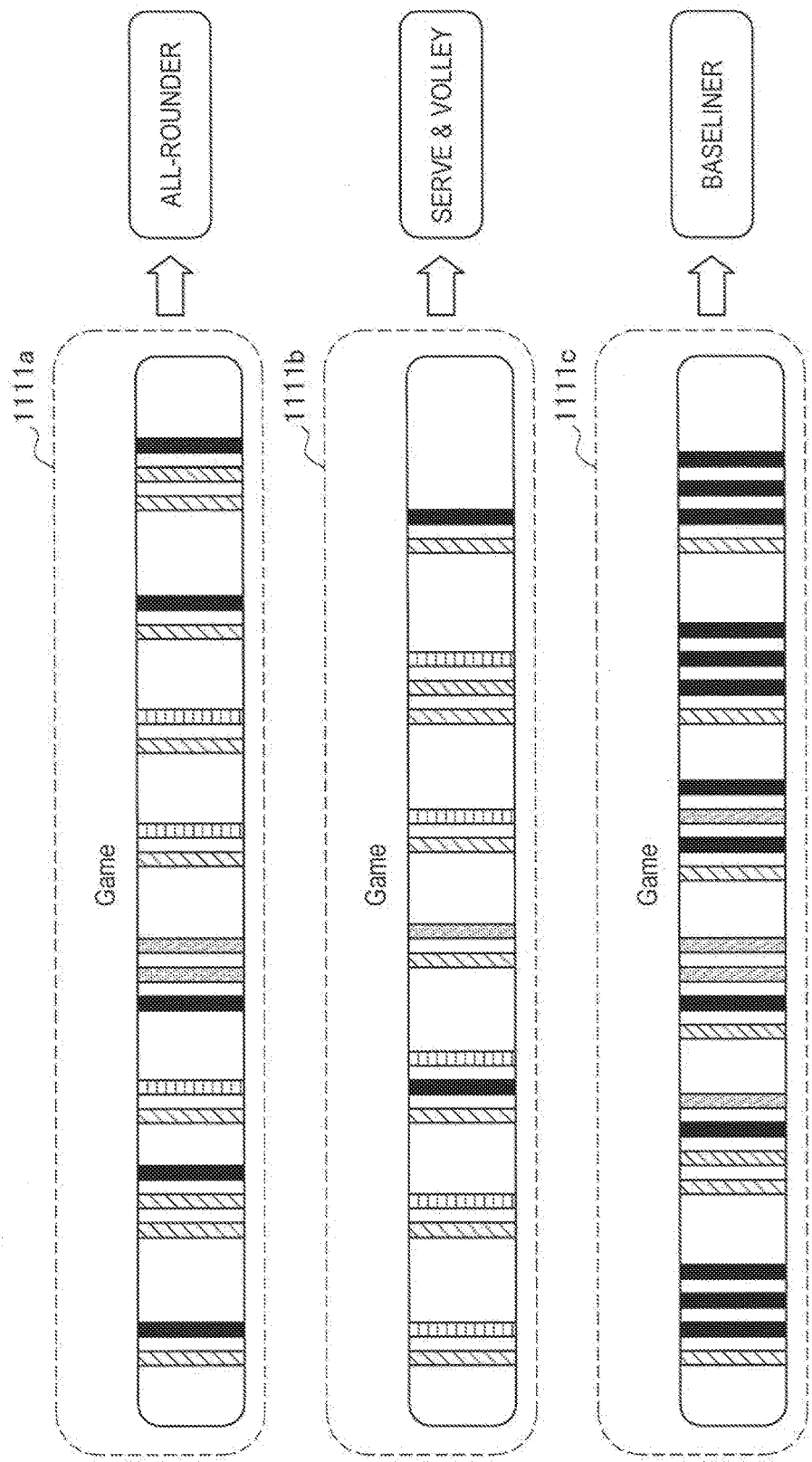
FIG. 16 is a diagram for describing another example of a play pattern according to an embodiment of the present disclosure.

FIG. 16 is a diagram for describing another example of the play pattern according to an embodiment of the present disclosure. In the illustrated example, a play style of the user is estimated based on a play pattern 1111 in the game segment. For example, a user from whom a pattern having a feature indicated by a play pattern 1111a is largely detected in the game segment is estimated to have a play style of "all-rounder." A user from whom a pattern having a feature indicated by a play pattern 1111b is largely detected is estimated to have a play style of "serve & volley." A user from whom a pattern having a feature indicated by a play pattern 1111c is largely detected is estimated to have a play style of "baseliner."

Figure 17:
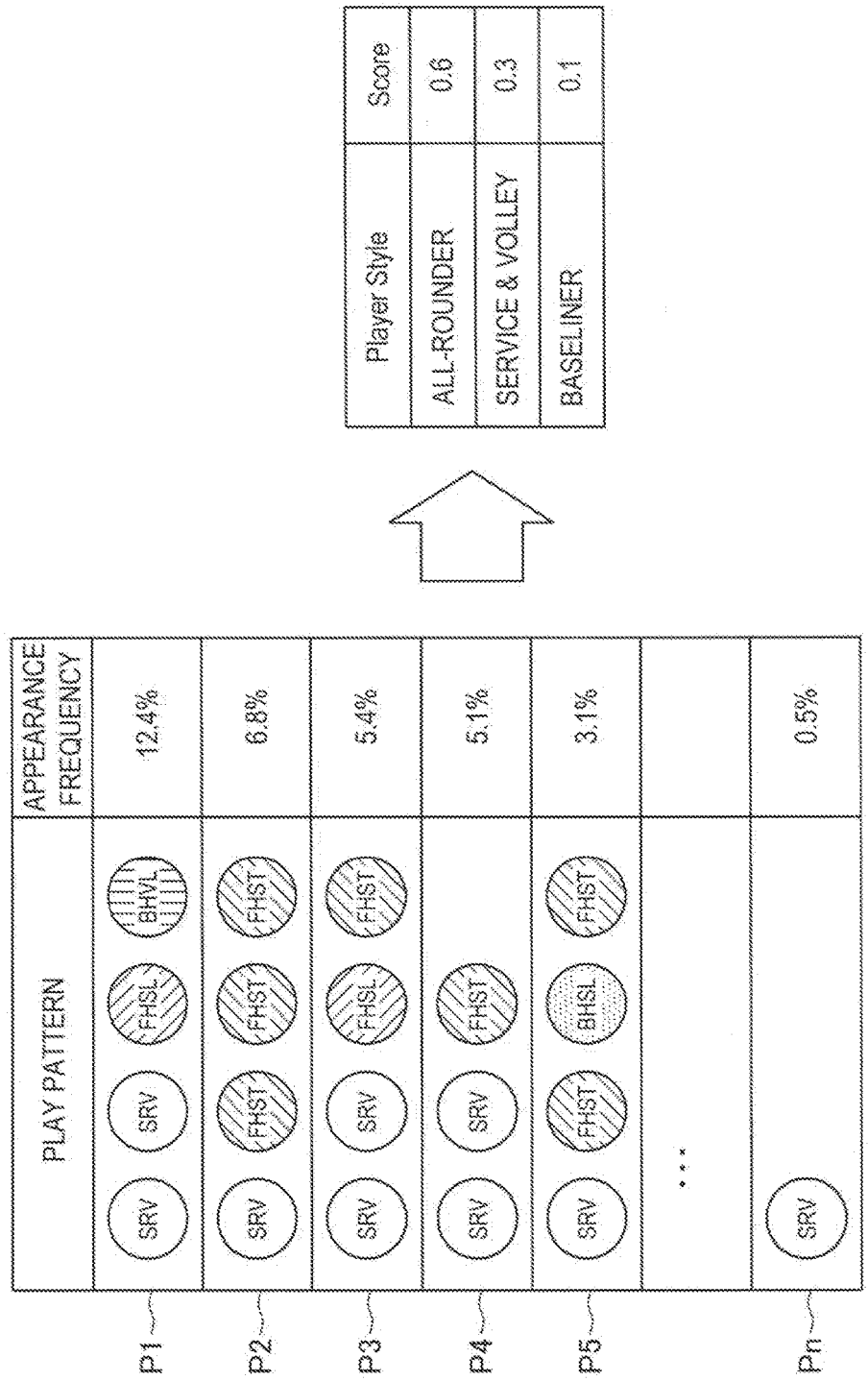
FIG. 17 is a diagram for describing a play style estimation process in an example of FIG. 16.

FIG. 17 is a diagram for describing a play style estimation process in the example of FIG. 16. Referring to FIG. 17, appearance frequencies of play patterns P1 to Pn in a history of the rally segment of the user are calculated. For example, the processor that performs the analysis process may estimate the play style of the user based on the appearance frequency of the play pattern in the history of the rally segment. In the illustrated example, a probability (score) that the play style will be "all-rounder" is estimated to be 0.6, a probability that the play style will be "service & volley" is estimated to be 0.3, and a probability that the play style will be "baseliner" is estimated to be 0.1. Based on the score, the play style of the user may be estimated to be "all-rounder."

FIG. 18 is a diagram for describing a comparison of the users in the play style estimation process illustrated in the example of FIG. 17. Referring to FIG. 18, the appearance frequency of the play pattern illustrated in FIG. 17 is calculated for each of two users (a first user and a second user). For example, the processor that performs the analysis process may estimate the play styles of the users based on the data and estimate information based on a result of comparing the play styles. The information generated herein may include, for example, compatibility between a first player and a second player. The compatibility between the players includes, for example, a degree of suitability as an opponent or a partner for the first player and the second player. The generated information may include a degree of similarity of styles.

For example, when the scores of the defined play styles are calculated as in the example of FIG. 17, the processor that performs the analysis process may perform a comparison in a state in which the play styles of the users are not specified. In other words, in this case, the user of the example illustrated in FIG. 17 is compared with the other user as "the user having the score of all-rounder: 0.6, service & volley: 0.3, and baseliner: 0.1."

The example described above with reference to FIGS. 16 to 18 is an example in which the play events are classified into time-series segments (which may have a hierarchical structure) corresponding to the play units of the sport based on the temporal arrangement thereof, the play pattern is estimated based on an arrangement of the play events in the segment, and the play style of the user is estimated based on the play patterns estimated for a plurality of segments. The play style may be estimated, for example, based on the appearance frequencies of the play patterns in a plurality of segments. The users include the first user and the second user, and information may be generated based on a result of comparing the play styles estimated for the first user and the second user.

In addition, in the present embodiment, the processor that performs the analysis process may implement, for example, a function of evaluating the play event based on the arrangement of the play events in the segment. More specifically, for example, in the rally segment 1105*d* illustrated in FIG. 13, when only the play event 1101*c* of one first serve occurs in the segment, the serve may be estimated to be the first serve. On the other hand, in the rally segment 1105*d*, when the play events 1101*c* of two first serves occur in the segment, the first serve is estimated to have failed, and the next serve is estimated to be the second serve.

(5. Analysis of Practice Segment)

Figure 19:
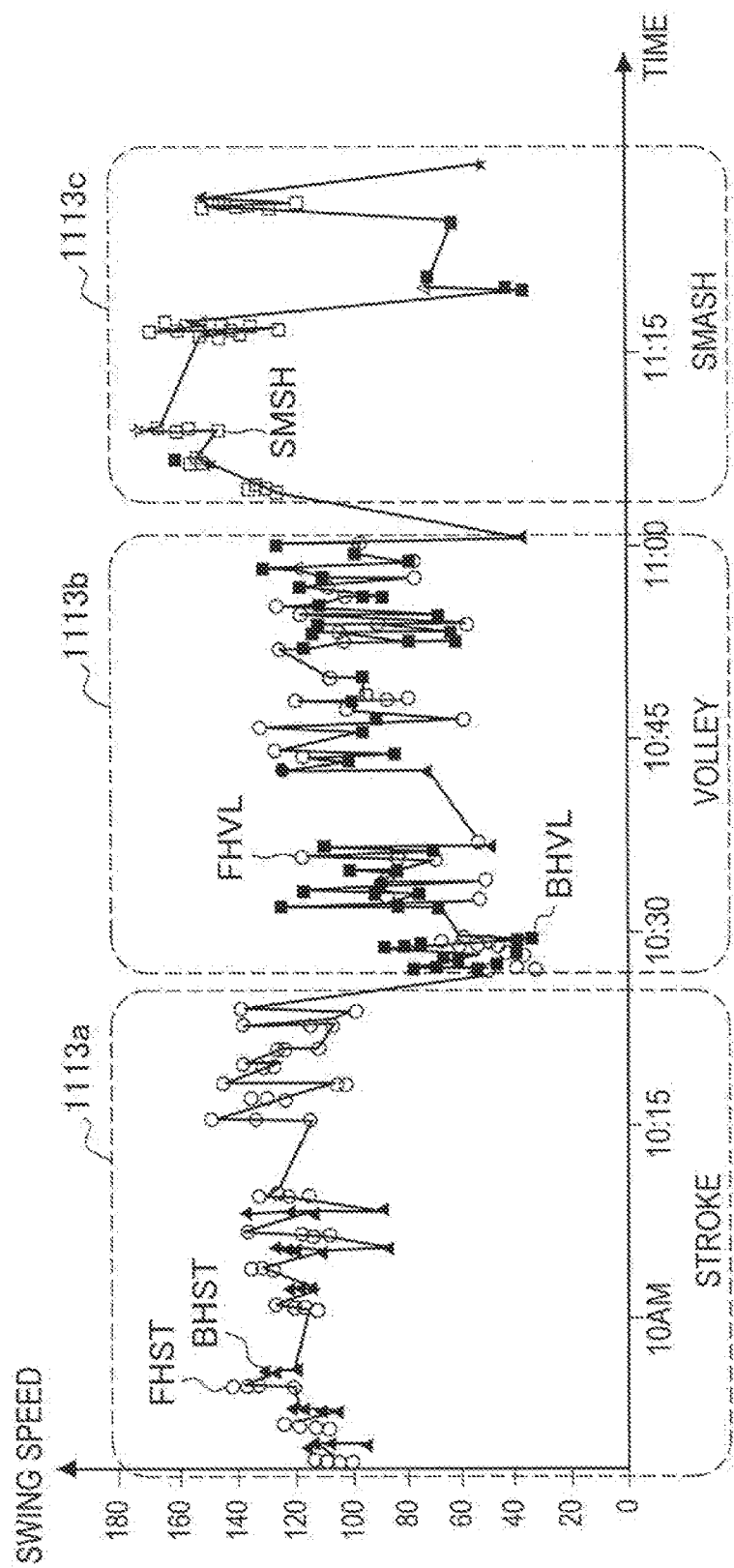
FIG. 19 is a diagram for describing time-series event data of a practice segment according to an embodiment of the present disclosure.

FIG. 19 is a diagram for describing the time-series event data of the practice segment according to an embodiment of the present disclosure. FIG. 19 illustrates a relation between the play events classified into practice segments 1113 and the swing speeds of the respective play events (shots). The practice segments 1113 include a segment 1113*a* of stroke practice, a segment 1113*b* of volley practice, and a segment 1113*c* of smash practice.

In the illustrated example, the play events of the forehand stroke (FHST) and the backhand stroke (BHST) are largely detected in the segment 1113*a* of the stroke practice, the play events of the forehand volley (FHVL) and the backhand volley (BHVL) are largely detected in the segment 1113*b* of the volley practice, and the play event of the smash (SMSH) is largely detected in the segment 1113*c* of the smash practice. The segment of the practice may be specified, for example, by a play event of a certain type that is largely detected as described above. The segment of the practice may be specified, for example, by the swing speeds illustrated in FIG. 19 that are relatively slower than those in a match.

Figure 20:
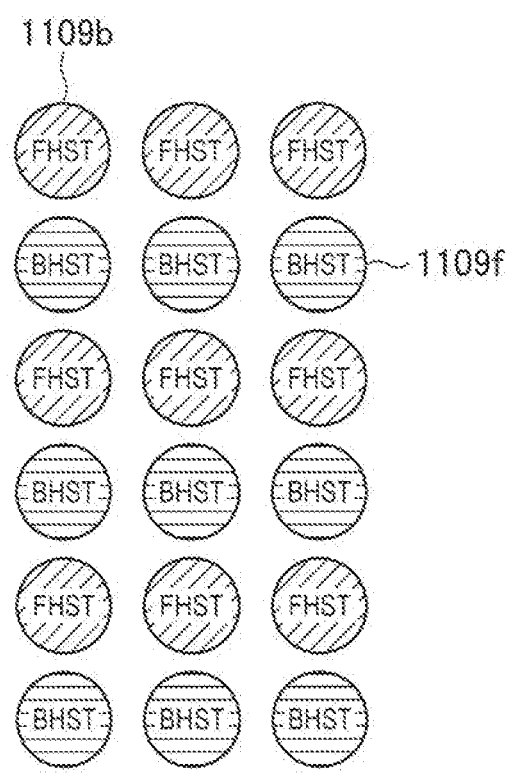
FIG. 20 is a diagram illustrating an example of a play pattern detected for a segment of stroke practice illustrated in FIG. 19.

FIGS. 20 and 21 are diagrams illustrating examples of the play patterns detected in the segment of the stroke practice illustrated in FIG. 19. Referring to FIG. 20, it is understood that in the segment 1113*a* of the stroke practice, a play event 1109*b* of a forehand stroke and a play event 1109*f* of a backhand stroke occur alternately three times each. In this regard, the processor that performs the analysis process defines a play pattern P1 in which the three forehand strokes consecutively occur and a play pattern P2 in which the three backhand strokes consecutively occur as illustrated in FIG. 21. In the example illustrated in FIG. 20, each of the play patterns P1 and P2 occurs three times.

As described above, in the present embodiment, the play pattern may be estimated for all segments, or the play pattern may be estimated for some intervals in the segment, for example, for intervals in which the play event repeats a certain sequence as in the above example.

Figure 22:
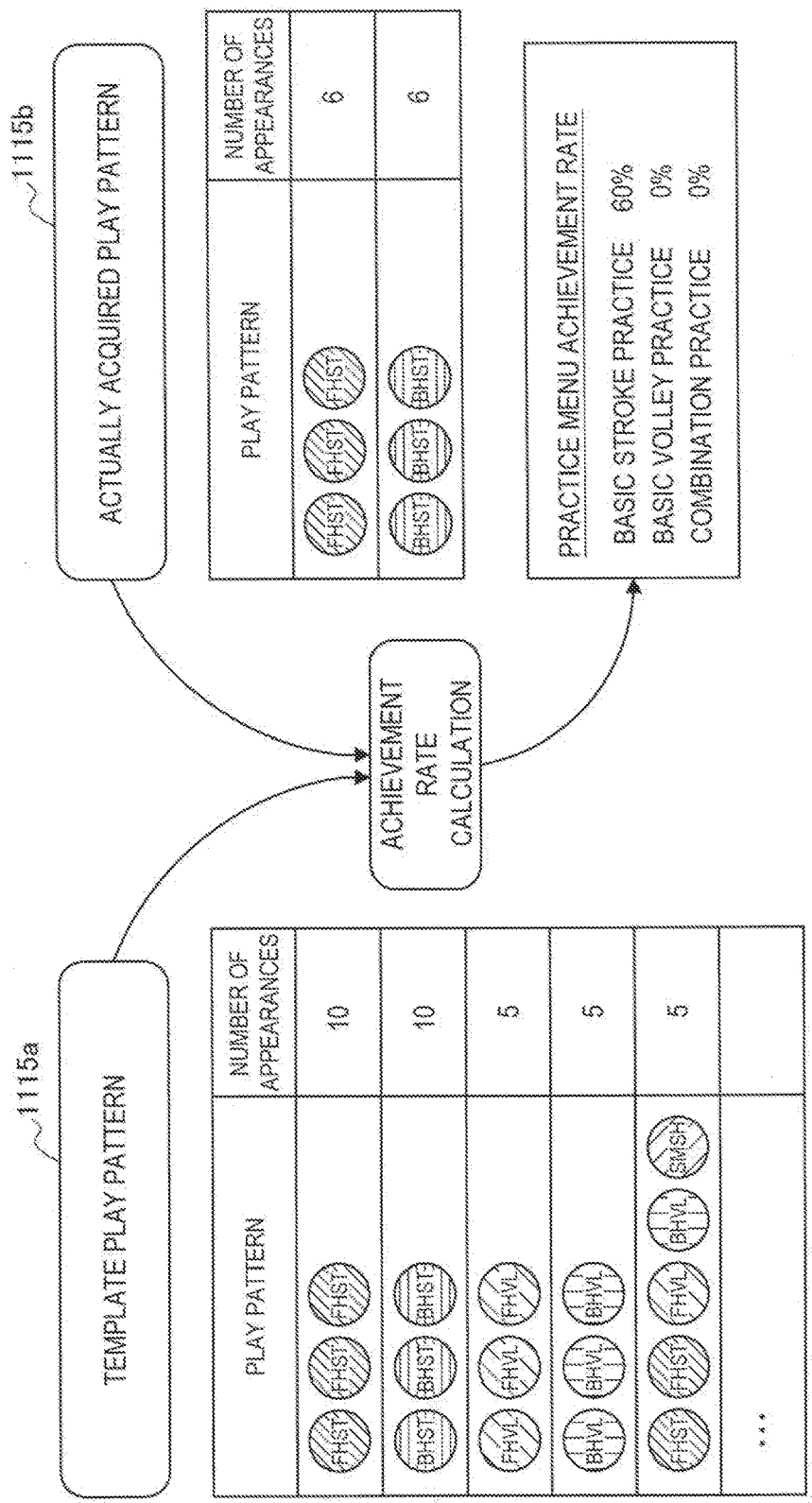
FIG. 22 is a diagram illustrating an example of information generated based on play patterns detected in FIGS. 20 and 21.

FIG. 22 is a diagram illustrating an example of information generated based on the play pattern detected in FIGS. 20 and 21. In the illustrated example, an achievement rate calculation between a template play pattern 1115*a* and an actually acquired play pattern 1115*b* is performed. The template play pattern 1115*a* may be, for example, a play pattern corresponding to a practice menu set in advance. In this case, by performing the achievement rate calculation, an achievement rate of a practice menu is calculated. By generating such information, it is possible to calculate the achievement rate of the practice menu based on the play pattern in the practice segment, and it is possible to obtain information useful for coaching or condition management of players.

As described above with reference to FIGS. 19 to 22, the process of estimating the play pattern, the play event, or the like in the present embodiment need not necessarily be performed on the segment and may be performed on some play event in the segment or play events arranged in time intervals not classified into segments.

(6. Examples of Other Sports)

Figure 23:
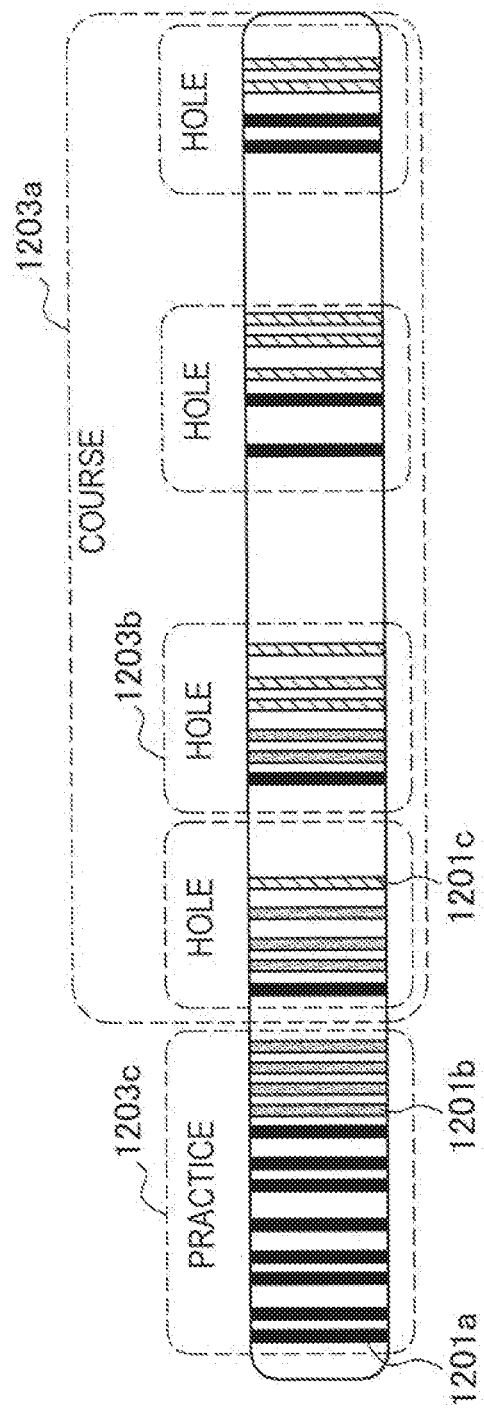
FIG. 23 is a diagram for describing an example in which segmentation according to an embodiment of the present disclosure is applied to golf.

FIG. 23 is a diagram for describing an example in which the segmentation according to an embodiment of the present disclosure is applied to golf. Referring to FIG. 23, a time series configured with play events 1201 is classified into segments 1203. More specifically, the play events 1201 include a play event 1201*a* of a driver shot, a play event 1201*b* of an iron shot, and a play event 1201*c* of a putt. The segments 1203 include a segment 1203*a* of a course, a segment 1203*b* of a hole, and a segment 1203*c* of practice.

For example, in golf, by mounting the sensor apparatus 100 on a player, a club, a glove, or the like, it is possible to acquire a detection result of a motion of the user who plays golf and define a play event based on the detection result. For such play events, for example, segments can be defined based on a rule that a play of each hole starts with a driver shot (or an iron shot) and ends with a putt.

Figure 24:
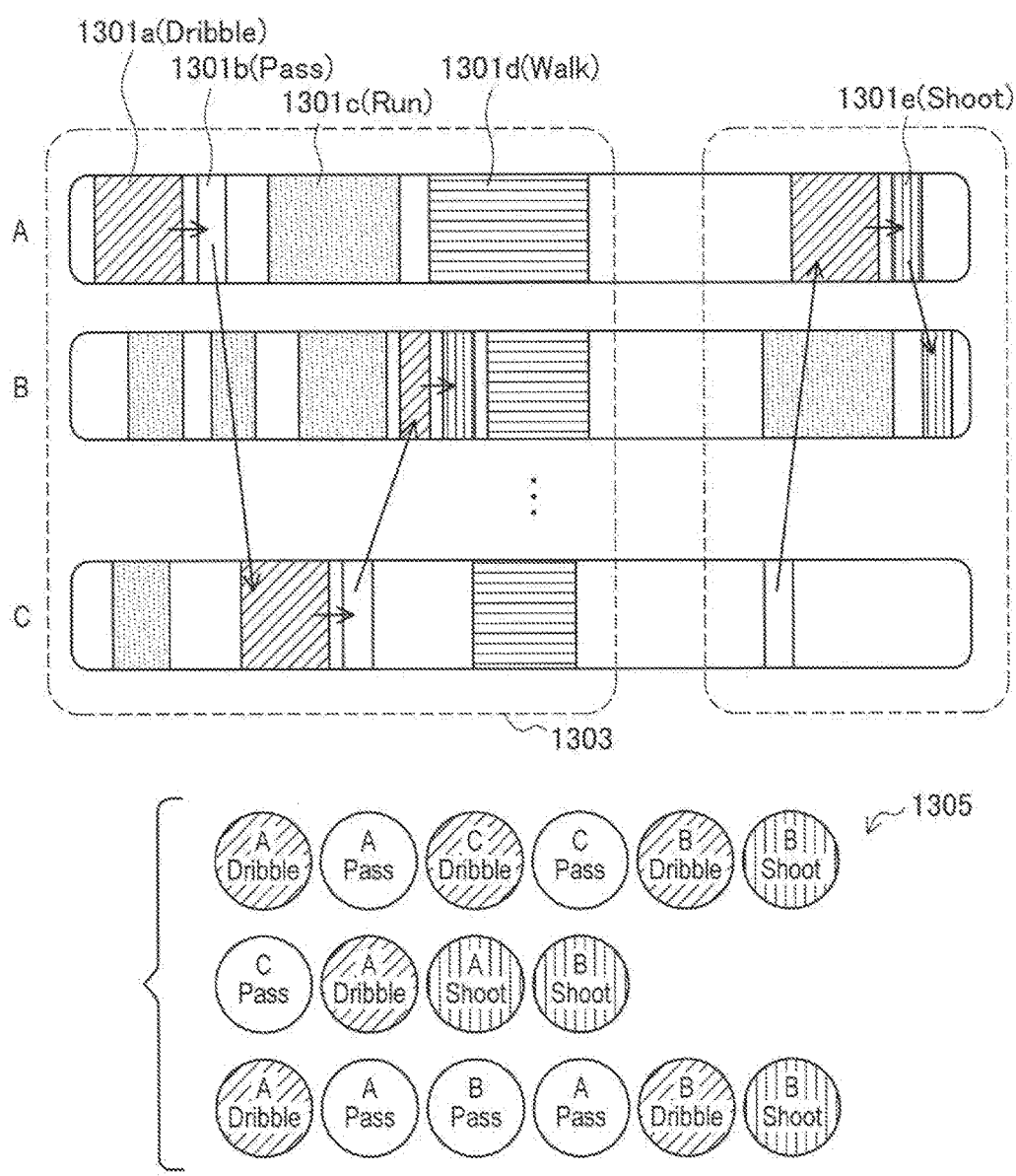
FIG. 24 is a diagram for describing an example in which segmentation according to an embodiment of the present disclosure is applied to soccer.

FIG. 24 is a diagram for describing an example in which the segmentation according to an embodiment of the present disclosure is applied to soccer. Referring to FIG. 24, a time series configured with play events 1301 is classified into segments 1303. More specifically, the play events 1301 include a play event 1301*a* of dribbling, a play event 1301*b* of passing, a play event 1301*c* of running, a play event 1301*d* of walking, and a play event 1301*e* of shooting.

For example, in soccer, by mounting the sensor apparatus 100 on a player, a shoe, or the like, it is possible to acquire a detection result of a motion of the user who plays soccer and define a play event based on the detection result. However, in the case of soccer, since a plurality of users play with one ball, it is desirable to classify play events into segments based on a relation of temporal arrangements of play events of related users. Such a segment classification process can be generalized as a process in which the users playing a sport include a first user and a second user, and segments common to the first user and the second user are set based on a temporal relation of play events of the first user and the second user.

In the illustrated example, a period of time until a play is stopped because of a goal, the ball going out of bounds, or the like after the play is started with a kickoff, a throw-in, or the like are classified as one segment 1303. For example, the segment 1303 may be defined as a period of time until the play events of all the players are either of the play event 1301d of walking or non-detection of the play event (a state to be estimated as a stop) after the play event of non-walking of any player (which is any one of A to C in the illustrated example and may be two or more) is started. This is a definition of a segment based on a feature in which, in a soccer play, any one player performs running or a motion (dribble, pass, shoot, or the like) associated with a ball while the play continues, and the players stop or walk when the play stops.

In the illustrated example, a play pattern 1305 is estimated based on an arrangement of the play events 1301 in the segment 1303. The play pattern 1305 is a play pattern of a team configured with a plurality of users (which are A to C in the illustrated example and may be more than three). More specifically, one play pattern 1305 is defined by moving across the play events of the respective members of the team such as "dribble of A—pass of A—dribble of C—pass of C—dribble of B—shoot of B" (refer to arrows in a time chart). Such a play pattern estimation process can be generalized as a process in which the users playing a sport include a first user and a second user, and a play pattern of a team including the first user and the second user is estimated based on a relation of a temporal arrangement of the play events of the first user and the second user.

At this time, among the play events of the respective members, several types of events (for example, running or walking not related to a ball) may not be included in the play pattern. Thus, the processor that performs the analysis process may specify the user that generates the play events (for example, the play events of dribbling, passing, or the like related to a ball) used for specifying the play pattern, for example, at each time in the time series.

(7. Hardware Configurations)

Next, examples of hardware configurations for implementing the sensor apparatus and the analysis apparatus (in the above described examples, the sensor apparatus, the smart phone or the server) according to an embodiment of the present disclosure will be described with reference to FIG. 25 and FIG. 26.

(Sensor Apparatus)

Figure 25:
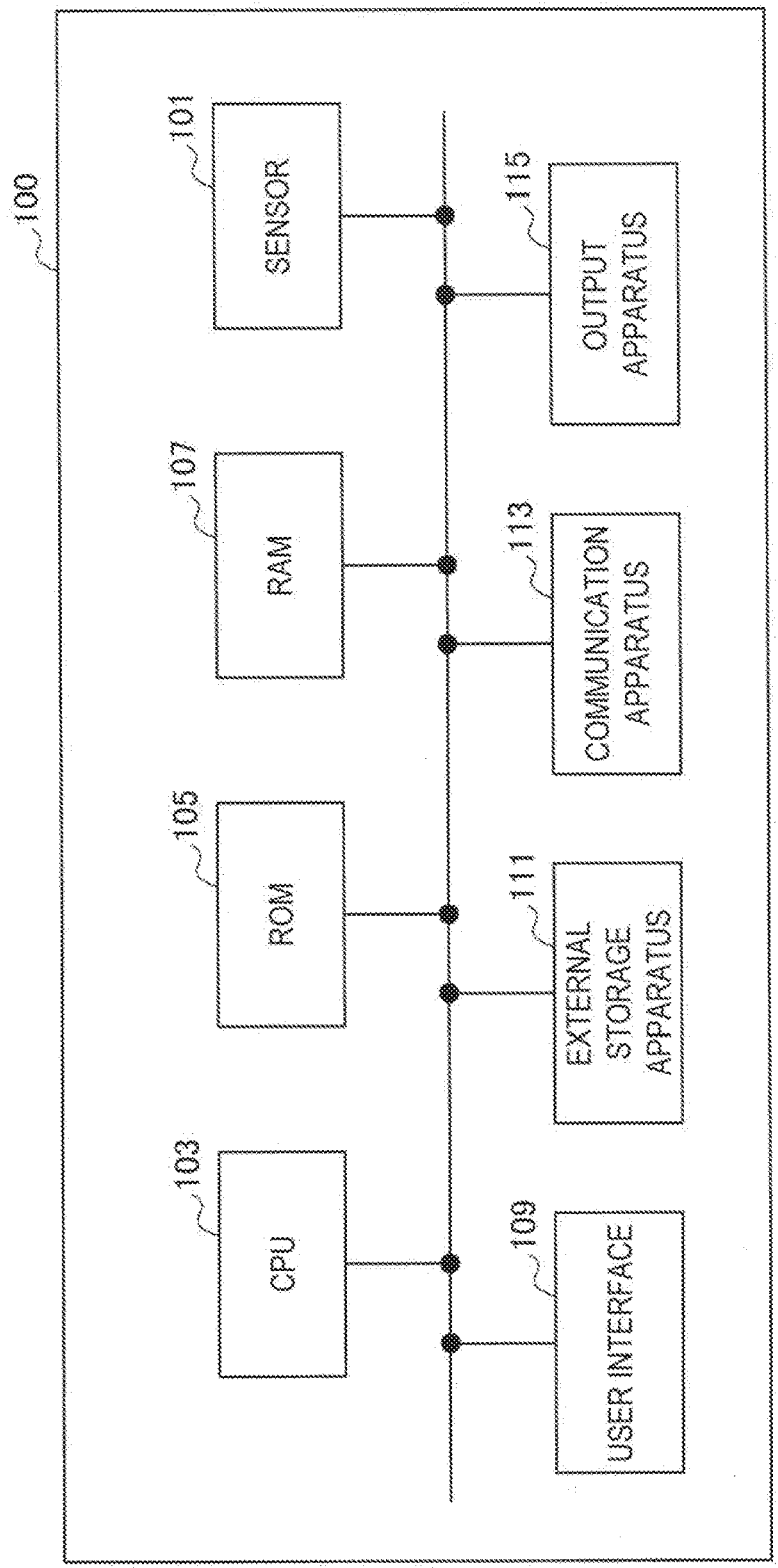
FIG. 25 is a diagram illustrating an example of a hardware configuration of a sensor apparatus according to an embodiment of the present disclosure.

FIG. 25 is a diagram illustrating an example of a hardware configuration of the sensor apparatus according to an embodiment of the present disclosure. With reference to FIG. 25, the sensor apparatus 100 may include a sensor 101, a Central Processing Unit (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (imaging sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

Further, a configuration corresponding to an internal storage region (a memory or an external storage device) that accumulates data detected in the sensor apparatus 100 when the smart phone 200 is not arranged near the user who is playing a sport is the ROM 105, the RAM 107, and/or the external storage apparatus 111.

The communication apparatus 113 communicates with the analysis apparatus 600, which will be described later, by various types of wired or wireless communication systems. Further, the communication apparatus 113 may directly communicate with the analysis apparatus 600 by inter-device communication, or may communicate with the analysis apparatus 600 via a network such as the internet.

The output apparatus 115 is constituted by an apparatus capable of outputting information as light, audio or images. For example, the output apparatus 115 may output information which notifies detection of a time or play event in the sensor apparatus 100, or may output a visual or aural notification to a user, based on an analysis result received from the analysis apparatus 600 or an analysis result calculated in the sensor apparatus 100. For example, the output apparatus 115 includes, for example, a display such as a lamp of an LED or the like or an LCD, a speaker, a vibrator or the like.

(Analysis Apparatus)

Figure 26:
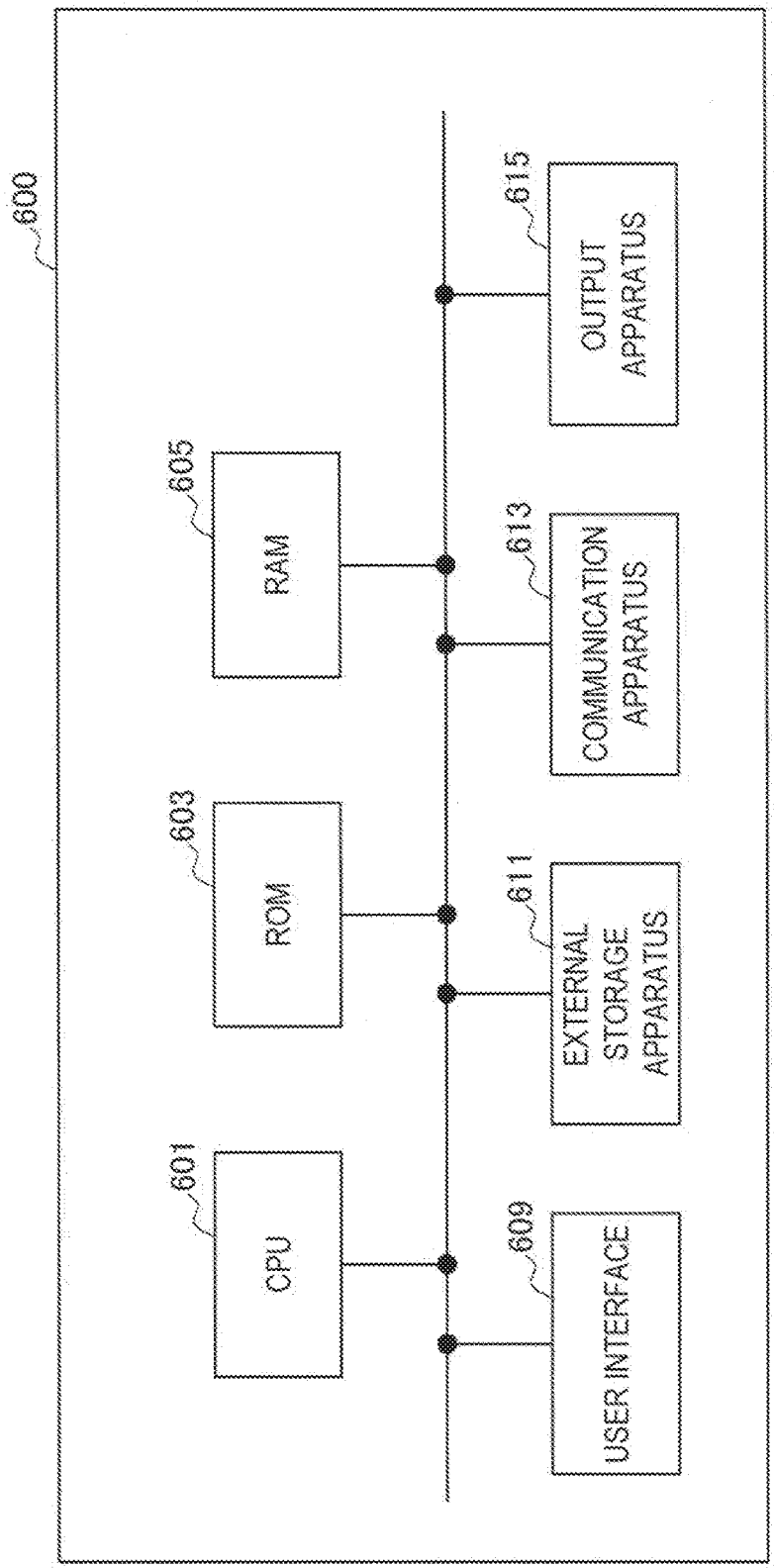
FIG. 26 is a diagram illustrating an example of a hardware configuration of an analysis apparatus according to an embodiment of the present disclosure.

FIG. 26 is a diagram illustrating an example of a hardware configuration of the analysis apparatus according to an embodiment of the present disclosure. The analysis apparatus 600 may implement, for example, the analysis apparatus according to an embodiment of the present disclosure, or the smart phone 200 or the server 300 described above. Note that, as described above, the analysis apparatus may be implemented by the sensor apparatus 100.

The analysis apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire analysis apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the analysis apparatus 600.

The external storage apparatus 611 stores various types of information related to the analysis apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the analysis apparatus 600 as video images such as text or pictures, or outputs the results as audio such as voices or sounds.

Heretofore, examples of the hardware configurations of the sensor apparatus 100 and the analysis apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

(8. Supplement)

For example, the embodiments of the present disclosure may include an analysis apparatus such as that described above (an information processing terminal such as a smart phone, a server, or a sensor apparatus), a system, an information processing method executed by the analysis apparatus or the system, a program for causing the analysis apparatus to function, and a non-temporarily tangible medium on which programs are recorded.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) An analysis device, including:
a processor configured to implement
an acquisition function of acquiring information indicating play events that are defined based on a motion of a user who plays a sport and arranged within a time interval, and
a pattern estimation function of estimating a play pattern based on an arrangement of the play events.

(2) The analysis device according to (1),
wherein the processor is configured to further implement a style estimation function of estimating a play style of the user based on the play patterns estimated for a plurality of the intervals.

(3) The analysis device according to (2),
wherein the style estimation function estimates the play style based on appearance frequencies of the play patterns in the plurality of intervals.

(4) The analysis device according to (2) or (3),
wherein the user includes a first user and a second user, and
wherein the processor is configured to further implement a comparison information generation function of generating information based on a result of comparing the play styles estimated for the first user and the second user.

(5) The analysis device according to (4),
wherein the comparison information generation function generates information of estimating compatibility between the first user and the second user.

(6) The analysis device according to (5),
wherein the comparison information generation function estimates a degree of suitability as opponents or partners for the first player and the second player.

(7) The analysis device according to any one of (1) to (6),
wherein the user includes a first user and a second user, and
wherein the pattern estimation function estimates a play pattern of a team including the first user and the second user based on a relation of a temporal arrangement of the play events of the first user and the second user.

(8) The analysis device according to any one of (1) to (7),
wherein the time interval is a time-series segment corresponding to a play unit of the sport,
wherein the play events are classified into the segments based on the temporal arrangement, and
wherein the pattern estimation function estimates a play pattern of the user based on an arrangement of the play events in the segment.

(9) The analysis device according to (8),
wherein the processor is configured to further implement a type estimation function of estimating a type of the play unit based on the play pattern.

(10) The analysis device according to (8) or (9),
wherein the play events are classified into the segments further based on a rule of the sport.

(11) The analysis device according to any one of (8) to (10),
wherein the play events are classified into the segments further based on a feature of the motion corresponding to the play event.

(12) The analysis device according to any one of (8) to (11),
wherein the user includes a first user and a second user, and
wherein the play events are classified into the segments common to the first user and the second user based on a relation of the temporal arrangement of the play events of the first user and the second user.

(13) The analysis device according to any one of (8) to (12),
wherein the play events are classified into the segments which are hierarchical.

(14) The analysis device according to any one of (1) to (13),
wherein the play event is defined based on a detection result of the motion of the user by a sensor directly or indirectly mounted on the user.

(15) The analysis device according to (14),
wherein the processor is configured to further implement
a function of receiving the detection result from the sensor, and
a function of defining the play event based on the detection result.

(16) A recording medium having a program stored therein, the program causing a computer to implement:
an acquisition function of acquiring information indicating play events that are defined based on a motion of a user who plays a sport and arranged within a time interval; and
a pattern estimation function of estimating a play pattern based on an arrangement of the play events.

(17) An analysis method, including:
acquiring, by a processor, information indicating play events that are defined based on a motion of a user who plays a sport and arranged within a time interval; and
estimating, by the processor, a play pattern based on an arrangement of the play events.

REFERENCE SIGNS LIST 10 system
100 sensor apparatus
110 sensor
120 processing section
200 smart phone
210 reception section
220 processing section
300 server
310 reception section
320 processing section
401 time-series event data
403 preprocessing
405 analysis process
407 segmentation
409 model

The invention claimed is:
1. An analysis device, comprising:
at least one processor communicably connected to a sensor, wherein the at least one processor is configured to:
acquire, from the sensor via wireless communication, first motion information of a first user and second motion information of a second user;
detect a first motion of the first user and a second motion of the second user based on the first motion information and the second motion information, respectively,
wherein the first motion information and the second motion information indicate a first play event and a second play event from a plurality of play events, respectively;
associate the first play event with a first time interval and the second play event with a second time interval based on the detected first motion and the detected second motion, respectively;
determine a first play pattern of the first user and a second play pattern of the second user from a plurality of play patterns, based on the association of the first play event with the first time interval and the second play event with the second time interval;
determine a first play style of the first user and a second play style of the second user based on the determined first play pattern and the determined second play pattern;
compare the determined first play style of the first user and the determined second play style of the second user; and
determine compatibility between the first user and the second user based on a degree of similarity in the determined first play style and the determined second play style.

2. The analysis device according to claim 1,
wherein the first play style of the first user and the second play style of the second user is based on appearance frequencies of the plurality of play patterns for the first user and the second user, respectively.

3. The analysis device according to claim 1,
wherein the at least one processor is further configured to determine a degree of suitability as one of opponents or partners for the first user and the second user.

4. The analysis device according to claim 1,
wherein the at least one processor is further configured to determine a third play pattern of a team including the first user and the second user based on a relation of a temporal arrangement of the plurality of play events of the first user and the second user, respectively.

5. The analysis device according to claim 1,
wherein the first time interval and the second time interval is a time-series segment corresponding to a play unit of a sport, and
wherein the at least one processor is further configured to classify the plurality of play events into a plurality of time-series segments based on a temporal arrangement of the plurality of play events for the first user and the second user.

6. The analysis device according to claim 5,
wherein the at least one processor is further configured to identify a type of the play unit based on the first play pattern and the second play pattern.

7. The analysis device according to claim 5,
wherein the plurality of play events is classified into the plurality of time-series segments based on a rule of the sport.

8. The analysis device according to claim 5,
wherein the plurality of play events is classified into the plurality of time-series segments based on a feature of a motion corresponding to at least one of the first play event of the first user or the second play event of the second user.

9. The analysis device according to claim 5,
wherein the plurality of play events is classified into the plurality of time-series segments based on a common time-series segment that is common to the first user and the second user.

10. The analysis device according to claim 5,
wherein the classified plurality of play events is hierarchical.

11. The analysis device according to claim 1, wherein the sensor is one of directly mounted on the first user and the second user or indirectly mounted on the first user and the second user.

12. A non-transitory computer-readable medium having computer-executable instructions, which when executed by a computer, cause the computer to execute operations, the operations comprising:
acquiring, via a sensor, first motion information of a first user and second motion information of a second user;
detecting a first motion of the first user and a second motion of the second user based on the first motion information and the second motion information, respectively,
wherein the first motion information and the second motion information indicate a first play event and a second play event from a plurality of play events, respectively;
associating the first play event with a first time interval and the second play event with a second time interval based on the detected first motion and the detected second motion, respectively;
determining a first play pattern of the first user and a second play pattern of the second user from a plurality of play patterns, based on the association of the first play event with the first time interval and the second play event with the second time interval;
determining a first play style of the first user and a second play style of the second user based on the determined first play pattern and the determined second play pattern;
comparing the determined first play style of the first user and the determined second play style of the second user; and
determining compatibility between the first user and the second user based on a degree of similarity in the determined first play style and the determined second play style.

13. An analysis method, comprising:
in an analysis device which comprises at least one processor that is communicably connected to a sensor,
acquiring, by the at least one processor from the sensor via wireless communication, first motion information of a first user and second motion information of a second user;
detecting, by the at least one processor, a first motion of the first user and a second motion of the second user based on the first motion information and the second motion information, respectively,
wherein the first motion information and the second motion information indicate a first play event and a second play event from a plurality of play events, respectively;
associating, by the at least one processor, the first play event with a first time interval and the second play event with a second time interval based on the detected first motion and the detected second motion, respectively;
determining, by the at least one processor, a first play pattern of the first user and a second play pattern of the second user from a plurality of play patterns, based on the association of the first play event with the first time interval and the second play event with the second time interval;
determining a first play style of the first user and a second play style of the second user based on the determined first play pattern and the determined second play pattern;
comparing the determined first play style of the first user and the determined second play style of the second user; and
determining compatibility between the first user and the second user based on a degree of similarity in the determined first play style and the determined second play style.

* * * * *